US012696313B2

(12) United States Patent
Xia

(10) Patent No.: US 12,696,313 B2
(45) Date of Patent: Jul. 28, 2026

(54) CHANNEL ACCESS FOR REMOTE RADIO HEADS (RRHS) IN WHICH MAC AND PHY LAYERS ARE IMPLEMENTED ON DIFFERENT DEVICES

(71) Applicants: SONY GROUP CORPORATION, Tokyo (JP); SONY CORPORATION OF AMERICA, New York, NY (US)

(72) Inventor: Qing Xia, San Jose, CA (US)

(73) Assignees: SSONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 451 days.

(21) Appl. No.: 18/498,146

(22) Filed: Oct. 31, 2023

(65) Prior Publication Data

US 2024/0224323 A1     Jul. 4, 2024

Related U.S. Application Data

(60) Provisional application No. 63/478,459, filed on Jan. 4, 2023.

(51) Int. Cl.
H04B 7/06         (2006.01)
H04L 5/00         (2006.01)
(Continued)

(52) U.S. Cl.
CPC ............................... H04W 74/0808 (2013.01)

(58) Field of Classification Search
CPC ... H04W 72/04; H04W 28/02; H04W 88/085; H04W 36/02; H04W 80/04; H04W 72/51;
(Continued)

(56) References Cited

U.S. PATENT DOCUMENTS 8,462,737  B1    6/2013   Gage
10,880,001 B2    12/2020  Finkelstein
(Continued)

OTHER PUBLICATIONS

Graham Smith (SR Technologies): "Resolution for CIDs 7087 7088 (EDCA) ; 11-16-0228-08-000m-resolution-for-cids-7087-7088-edca", IEEE Draft; IEEE-SA Mentor, May 10, 2016 (May 10, 2016), pp. 1-11, vol. 802.11 m, No. 8, XP068106641.
(Continued)

*Primary Examiner* — Marcus Smith
*Assistant Examiner* — Jason A Harley
(74) *Attorney, Agent, or Firm* — O'BANION & RITCHEY LLP; John P. O'Banion

(57)          ABSTRACT

A Central Unit (CU) is connected to multiple Remote Radio Heads (RRHs) over a backhaul. The spatial separation of units creates long round-trip times, which are addressed in the present disclosure. The enhanced operation allows for counting down a BackOff (BO) on either the RRH side or on the CU side. RRHs that perform the BO procedure can resolve the issue of insufficient InterFrame Space (IFS) time for the RRH to obtain Data from the CU and to invoke a BO. In addition, RRHs that perform the BO procedures are able to reduce channel access contention when multiple RRHs are performing BOs, while utilization efficiency for the medium can also be increased by the improved synchronization of BO and Clear Channel Assessment (CCA) status between the CU and RRHs.

19 Claims, 29 Drawing Sheets

(51) Int. Cl.

| | | |
|---|---|---|
| *H04L 69/14* | (2022.01) | |
| *H04W 72/04* | (2023.01) | |
| *H04W 72/0446* | (2023.01) | |
| *H04W 74/0808* | (2024.01) | |
| *H04W 88/08* | (2009.01) | |

(58) Field of Classification Search

CPC .. H04W 72/27; H04W 72/20; H04B 7/15528; H04L 47/2433; H04L 5/0044

USPC .................................................. 370/252, 329

See application file for complete search history.

(56) References Cited

U.S. PATENT DOCUMENTS

| | | | | |
|---|---|---|---|---|
| 2009/0059949 | A1* | 3/2009 | Singh ................ | H04W 72/1221 |
| | | | | 370/447 |
| 2010/0285756 | A1* | 11/2010 | Nakazawa ........... | H04L 47/263 |
| | | | | 455/69 |
| 2014/0036822 | A1* | 2/2014 | Maeda ................ | H04B 17/327 |
| | | | | 370/329 |
| 2015/0016309 | A1* | 1/2015 | Fang ................ | H04W 74/0808 |
| | | | | 370/277 |
| 2018/0309563 | A1* | 10/2018 | Hisano ................ | H04L 5/1423 |
| 2018/0343646 | A1 | 11/2018 | Chou | |
| 2019/0075438 | A1 | 3/2019 | Kuo | |
| 2021/0068184 | A1 | 3/2021 | Chu | |

OTHER PUBLICATIONS

Mountaser Ghizlane et al: "On the Feasibility of MAC and PHY Split in Cloud RAN", 2017 IEEE Wireless Communications and Networking Conference (WCNC), IEEE, Mar. 19, 2017 (Mar. 19, 2017), pp. 1-6, XP033095813.

Sunghyun Choi: "Normative Text Proposal to Fix Some EDCF Queuing Problems", IEEE, Piscataway, NJ, USA, Jan. 24, 2002 (Jan. 24, 2002), XP040383891.

* cited by examiner

Example 5-2

Example 7-9

CHANNEL ACCESS FOR REMOTE RADIO HEADS (RRHS) IN WHICH MAC AND PHY LAYERS ARE IMPLEMENTED ON DIFFERENT DEVICES

CROSS-REFERENCE TO RELATED APPLICATIONS

This application claims priority to, and the benefit of, U.S. provisional patent application Ser. No. 63/478,459 filed on Jan. 4, 2023, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to Remote Radio Heads (RRHs) controlled by a Central Unit (CU), and more particularly to overcoming issues arising from the split of the MAC and PHY layers across spatially separated devices.

2. Background Discussion

Open Systems Interconnection (OSI) is a conceptual model defined by International Organization for Standardization (ISO) to establish telecommunication between computing, network layer, data link layer, and physical layer. Those layers are used to define systems with standard communications protocols. Typically, OSI consists of seven layers comprising: application (APP) layer, presentation layer, session layer, transport layer, network layer, data link layer, and physical layer. The layers interoperate to standardize telecommunications functions. When two systems share the same communication protocol at the same layers, they are able to exchange information between each other.

IEEE 802.11 protocols define standard communication protocols at the data link (i.e., MAC) and physical (i.e., PHY) layers. The functionalities of the MAC and the PHY layers are implemented in the same IEEE 802.11 device so the interworking communication between the MAC and the PHY layers are only subject to short communication delays. The processing time of the interworking communication is short compared with the Distributed Coordination Function (DCF) timing requirements of IEEE 802.11.

However, when the functionalities of the MAC and the PHY layers are implemented on two different devices, such as arises with Remote Radio Heads (RRHs), the interworking communication between the MAC and the PHY (or between two devices) requires significantly longer times, and thus may violate the DCF timing requirements of IEEE 802.11. For example, a DCF Interframe Spacing (DIFS) time is 41 µs which requires an IEEE 802.11 device to at least wait when detecting Clear Channel Assessment (CCA) idle before initiating the first backoff slot. However, the best requirement of time-sensitive networking (TSN) of one-way communication is 25 µs. Then, the round-trip time (RTT) between the MAC layer on one device and the PHY layer on the other device is 50 µs. Thus, a RRH system can only guarantee initiating the first backoff slot after 50 µs, which is longer than a DIFS time as defined in the current IEEE specification.

Accordingly, a need exists for enhanced channel access handling for remote radio heads (RRHs). The present disclosure fulfills that need and provides additional benefits over existing systems.

BRIEF SUMMARY

An enhanced protocol is described for addressing specific issues which arise when the Medium Access Control (MAC) and Physical (PHY) layers in the protocol stack are located on spatially separate devices; specifically, between a Central Unit (CU) and a Remote Radio Head (RRH) which are connected over a backhaul link. It will be noted that the present disclosure is based on the use of Enhanced Distributed Channel Access (EDCA), and should apply to any of these RRH systems using Carrier-Sense Multiple Access. The enhanced protocol allows for counting down a BackOff (BO) on either the RRH side or on the CU side. RRHs that perform the BO procedure can resolve the issue of a possibly insufficient InterFrame Space (IFS) time for the RRH to obtain Data from the CU and to invoke a BO. In addition, RRHs that perform the BO procedures are able to reduce channel access contention when multiple RRHs are performing BOs. Channel utilization efficiency can also be increased as the protocol mitigates issues with the Round Trip Time (RTT) which exists between the RRH and the CU. These benefits at least partially arise due to improved synchronization of BO and Clear Channel Assessment (CCA) status between the CU and RRHs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 16 is a communication diagram (Example 7-9) in which the CU maintains the BO for each connected RRH and invokes the BO before receiving CCA status from RRHs, according to at least one embodiment of the present disclosure.

DETAILED DESCRIPTION

Figure 1:
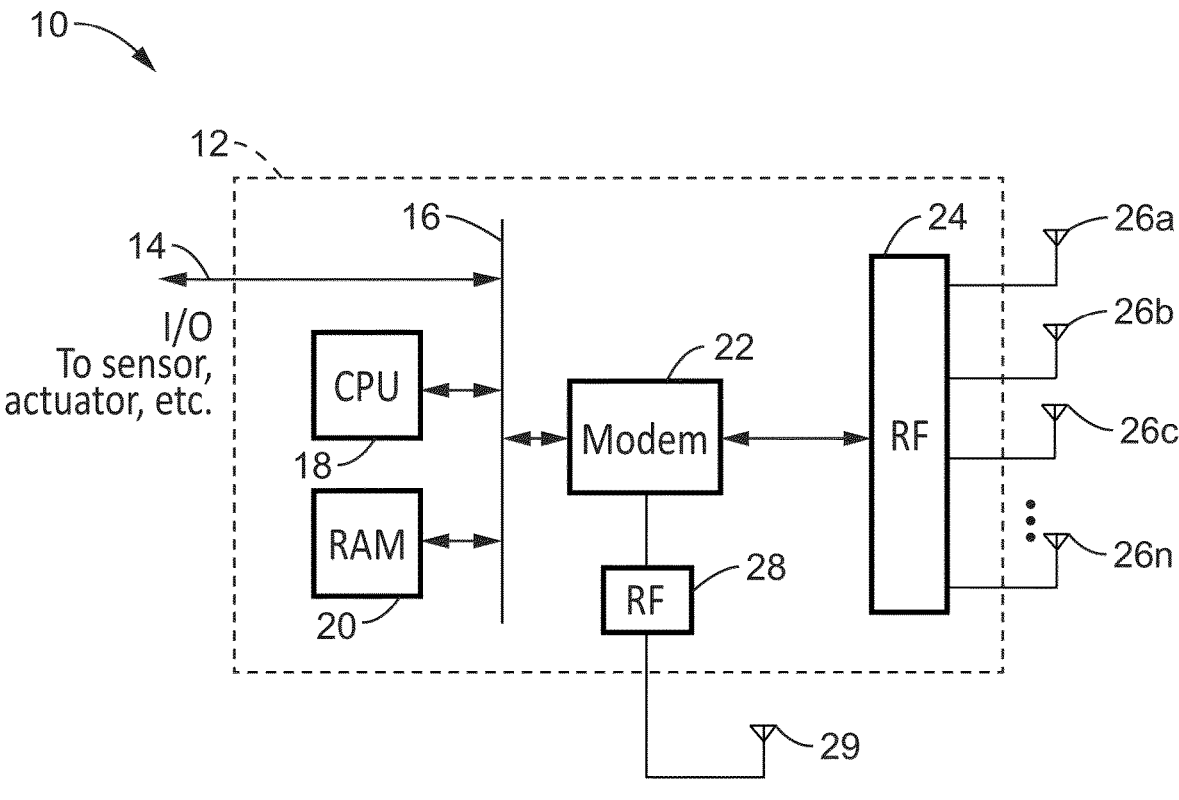
FIG. 1 is a block diagram of a communications Remote Radio Head (RRH) Station (STA) hardware according to at least one embodiment of the present disclosure.

1. Introduction.

In the IEEE 802.11 specifications, both physical and virtual Carrier Sense (CS) functions are used to determine the state of the medium (channel). When either function indicates a busy medium, the medium shall be considered busy; otherwise, it shall be considered idle.

The time interval between certain adjacent Physical Layer Protocol Data Units (PPDUs) is called the Inter-Frame Spacing (IFS). A STA determines that the medium is idle through the use of the CS function for the interval specified. Different values of IFS are defined to provide priority levels for access to the wireless medium. For example, DIFS is DCF Interframe Space; EIFS is Extended Interframe Space; and AIFS[AC] is AIFS Arbitration Interframe Space (for the AC used by the QoS facility).

In the IEEE 802.11 specification, before transmission, the STA first invokes the CS mechanism. After a certain Inter Frame Space (IFS), e.g., DIFS, EIFS or AIFS[AC], of the medium being time, the STA generates the Back Off (BO) count. If the medium is busy during a BO slot, then the BO counter is not decremented for that slot. The BO counter is then decremented after the medium has been determined to be idle for the duration of a DIFS or EIFS plus aSlotTime, which is 9 μs.

2. Problem Statement

The current technologies do not take into consideration the function split of the MAC and the PHY layers of IEEE 802.11 across two separate devices. When the functionalities of the MAC and the PHY layer are implemented on two devices, the interworking communication between the MAC and the PHY (or between two devices) requires a longer time (increased communication latency) than when the MAC and PHY layer functions are implemented in the same device; thus, the function split of the MAC and PHY layers may violate the DCF timing requirement of IEEE 802.11.

When considering the use of Clear Channel Assessment (CCA), there will be a Round-Trip Time (RTT) since the Remote Radio Head (RRH) sends CCA status to a Central Unit (CU), and until the CU sends back PPDUs to the RRH over the backhaul. It should be noted that channel status may continue to change during this round trip time. Accordingly, when the RRH receives Data and/or a control message from the CU, the operation as indicated in the control message may already be out of date.

The BO procedure can be performed on either the RRH side or on the CU side. If the BO is processed on the RRH side, then after the RRH detects that the medium is idle for a given IFS time, (e.g., DIFS, EIFS or AIFS[AC]), the RRH invokes the BO procedure. However, this operation cannot be performed because the RTT is longer than the given IFS time. Moreover, when RRH has a zero BU, which is transmitted from the CU to the RRH, it cannot invoke the backoff (BO) procedure based on the current IEEE 802.11 specification. In this case, a new form of IFS timing relationship is required.

If BO is processed on the CU side, the CU BO timeout (BO value equals zero) may be out of date or invalidated when this message arrives at the RRH due to the RTT delay. The RTT delay causes loss of synchronization of CCA status and BO status between the RRH and CU; because the status information held by the CU and status information held by each RRH may not be the same. This condition leads to numerous issues in regard to utilizing the medium, such as collision and retransmission. New protocols are thus needed to maintain synchronization between the RRH and CU.

3. Contributions of the Present Disclosure

The present disclosure provides a number of benefits over existing protocols for RRH systems, a few of these are as follows. (a) The backoff (BO) procedure can be performed, on either the RRH side or on the CU side. (b) RRHs that perform a BO procedure can resolve the issue with insufficient IFS time for the RRH to obtain data from the CU and to invoke BO. (c) RRHs that perform a BO procedure are able to reduce channel access contention when multiple RRHs perform BOs. (d) RRHs that perform a BO procedure are able to increase channel utilization efficiency during the RTT between RRH and CU. (e) A CU that performs a BO procedure is able to improve synchronization of BO status between the CU and the RRHs.

4. Embodiments

4.1. Remote Radio Head (RRH) Station Hardware

FIG. 1 illustrates an example embodiment 10 of Remote Radio Head (RRH) Station (STA) hardware configured for executing the protocol of the present disclosure.

An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the RRH can transmit signals using multiple sets of beam patterns.

Bus 14 allows connecting various devices to the CPU, such as to sensors, actuators, a CU, and so forth. Instructions from memory 20 are executed on processor 18 to execute a program which implements the communications protocol.

Thus, the RRH HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the RRH determines it is unnecessary to communicate with neighboring RRHs. In at least one embodiment, the RF circuitry includes frequency converter, array antenna controller, and so forth, and is connected to multiple antennas which are controlled to perform beamforming for transmission and reception. In this way the RRH can transmit signals using multiple sets of beam patterns, each beam pattern direction being considered as an antenna sector.

Figure 2:
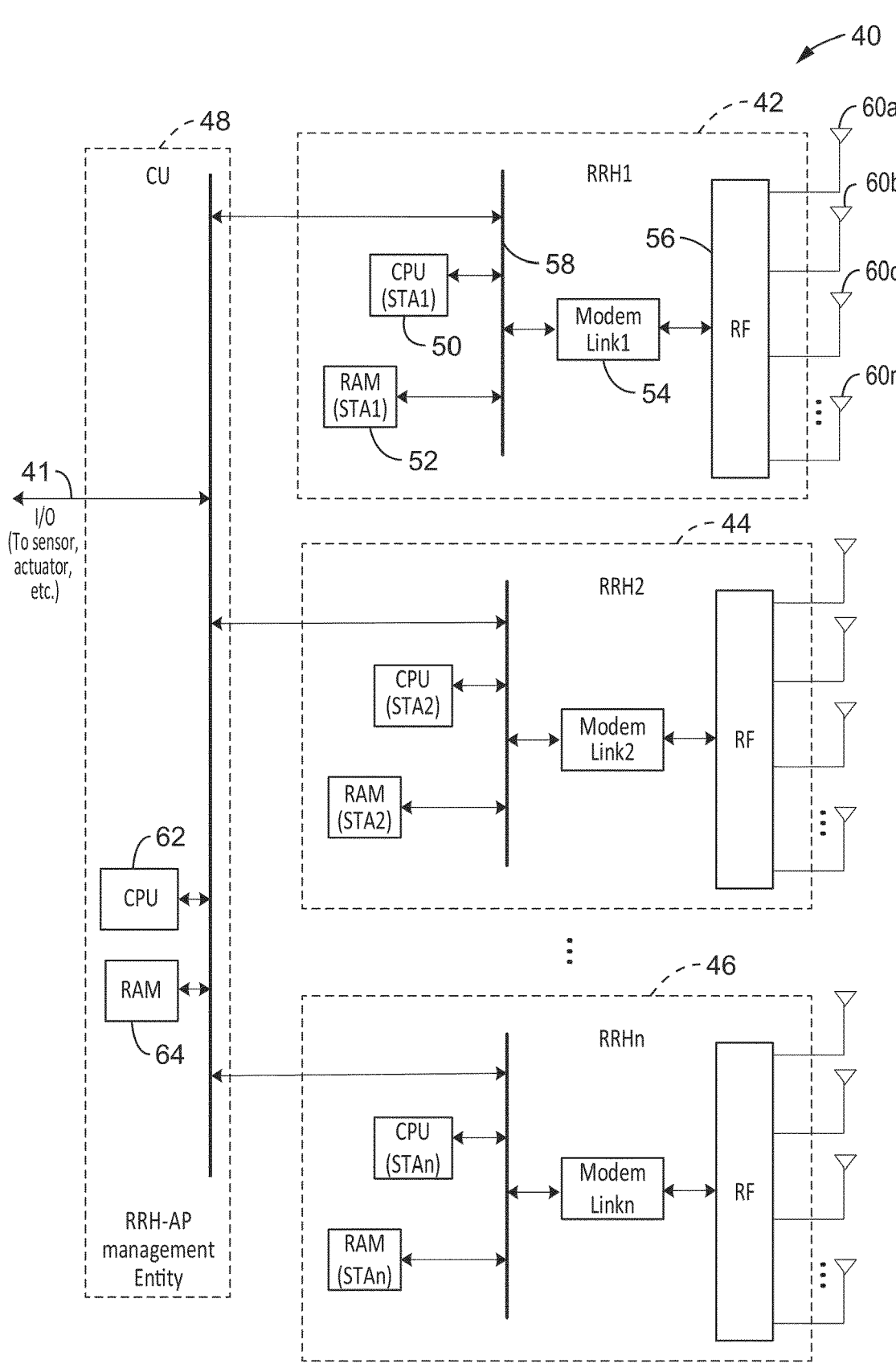
FIG. 2 is a block diagram of an RRH AP consisting of one CU and at least one RRH according to at least one embodiment of the present disclosure.

FIG. 2 illustrates an example embodiment 40 of a RRH AP consisting of one CU and at least one RRH. As shown in the figure, multiple RRHs are affiliated with a CU. It should be recognized that the CU and RRHs are at different geographical locations.

The CU has external I/O to access applications of CU, CPU and RAM of CU, to execute (run) a program that implements communication protocols at the MAC layer. The CU can distribute tasks to, and collect information from, each affiliated RRH and share information between affiliated RRHs.

It should be noted that the RRHs associate with one CU, and may operate on the same link, so there is no need to distribute the RRHs to different Modem Links.

The RRH has I/O to access applications, and a CPU and RAM to execute (run) a program that implements communication protocols at the PHY layer. The CU of the RRH accommodates a Modem which transmits/receives PPDUs with neighboring RRHs. A modem is connected to the RF module to generate and receive physical signals. The RF module, by way of example includes frequency converter, array antenna controller, and so forth. The RF module is connected to multiple antennas which are controlled to perform beamforming for transmission and reception. In this way, the RRH can transmit signals using multiple sets of beam patterns.

It should be noted that the per-RRH CPU and per-RRH RAM can be optional depending on the implementation.

It should be noted that if the RRH is compatible with the legacy STAs, then the RRH should also run a program that implements partial communication protocols at the MAC layer in order to send a response frame within aSIFSTime. Examples are shown in FIG. 23-25 and FIG. 26-28. Then, the CU should have access to that program through using external I/O.

In particular, the CU operates with one or more RRHs, with each RRH operating on a link of a different frequency. Each RRH has external I/O access, which is shown connecting to a CU 48 having a CPU 62 and memory (e.g., RAM) 64 to allow executing a program(s) that implements communication protocols at the CU level. The CU can distribute tasks to, and collect information from, each affiliated station to which it is connected, exemplified here as RRH1 42, RRH2 44 through to RRHn 46 and the sharing of information between affiliated RRHs.

In at least one embodiment, each RRH of the RRH AP has its own CPU 50 and memory (RAM) 52, which are coupled through a bus 58 to at least one modem 54 which is connected to at least one RF circuit 56 which has one or more antennas. In the present example, the RF circuit has multiple antennas 60a, 60b, 60c through 60n, such as in an antenna array. The modem in combination with the RF circuit and associated antenna(s) transmits/receives data frames with neighboring STAs. In at least one implementation, the RF module includes frequency converter, array antenna controller, and other circuits for interfacing with its antennas.

It should be appreciated that each RRH of the depicted RRH AP does not necessarily require its own processor and memory, as the RRHs may share resources with one another and/or with the RRH AP management entity, depending on the specific RRH AP implementation. It should be appreci-
ated that the above RRH AP diagram is given by way of
example and not limitation, whereas the present disclosure
can operate with a wide range of RRH AP implementations.

4.2. STA Topology for Consideration

Figure 3:
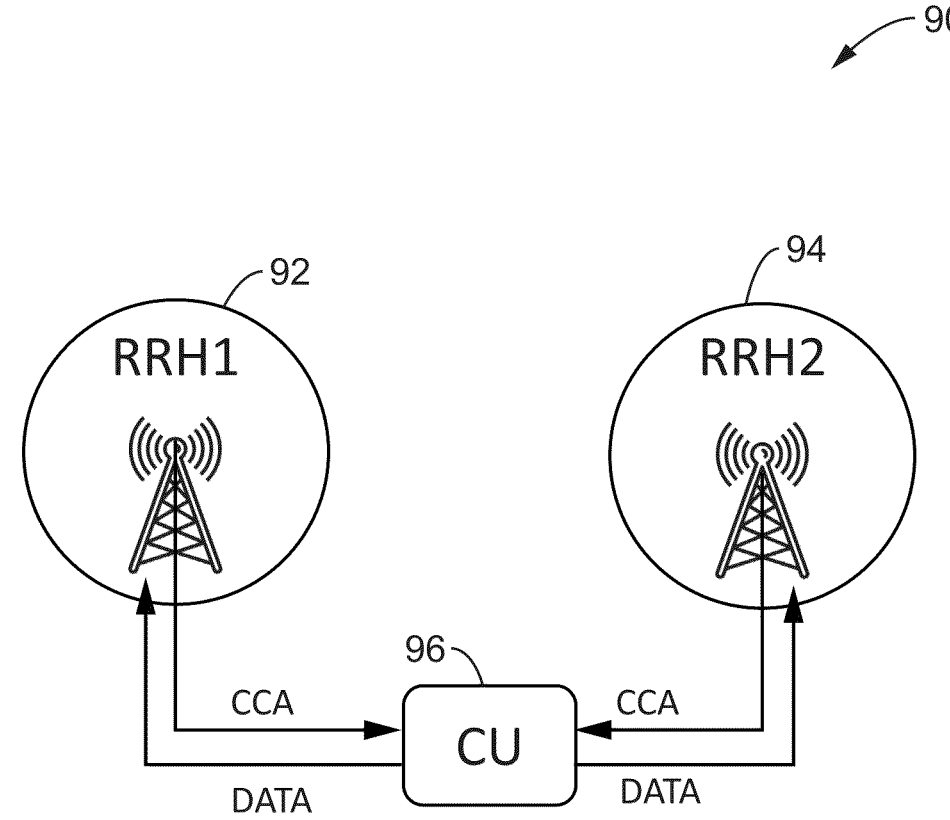
FIG. 3 is an RRH connection topology in an example of one Central Unit connecting to two RRHs, with the CU spatially separated from each RRH, as utilized according to at least one embodiment of the present disclosure.

FIG. 3 illustrates an example embodiment 90 of Remote
Radio Heads, RRH1 92 and RRH2 94 connected with the
same Central Unit (CU) 96 through connections generally
referred to as backhauls. RRH1 and RRH2 are not spatially
deviated, whereby they are subject to interference from each
other. Stated another way, the RRHs are not sufficiently
spatially separated to prevent interference from each other.
The CU performs transmission of frames (Data) (such as
MAC Service Data Units (MPDUs) or Aggregated MPDUs
(A-MPDUs)) between the MAC layers. RRH1 and RRH2
perform transmission and reception of the physical signal
through the channel, and process Clear Channel Assess-
ments (CCAs). A Backoff (BO) procedure can be performed
on the CU side or RRH side, as described later in this
disclosure.

5. CCA for RRH Examples

5.1. Example 5-1, Completing Synchronization With CU

Figure 4:
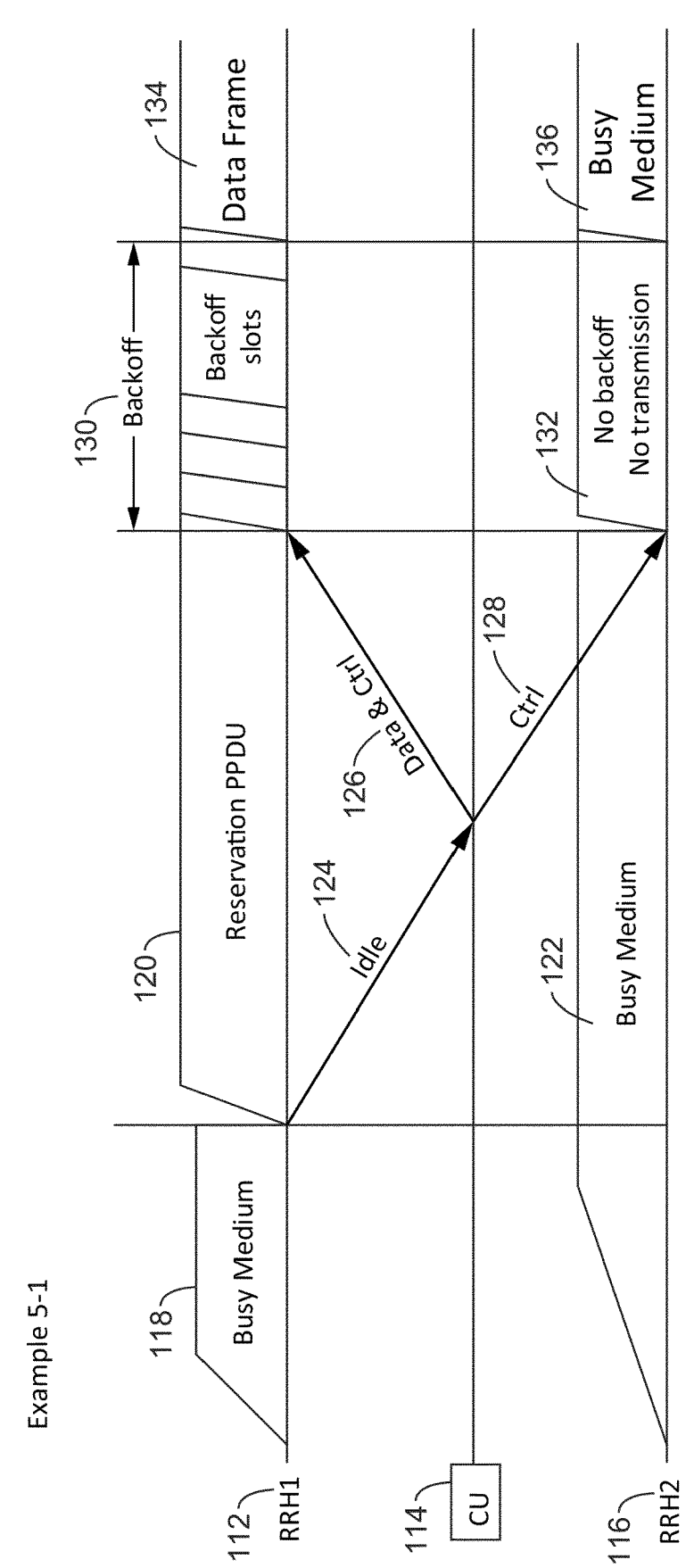
FIG. 4 is a communication diagram (Example 5-1) of an RRH sending a reservation PPDU for completing synchronization with the CU, according to at least one embodiment of the present disclosure.

FIG. 4 illustrates an example embodiment 110 (Example
5-1) of an RRH sending a reservation PPDU for completing
synchronization with the CU. The figure depicts interactions
between RRH1 112, CU 114, and RRH2 116.

It is first seen that the medium is busy 118, then RRH1
detects CCA idle and broadcasts a reservation PPDU 120 to
reserve the medium for at least a round trip time (RTT)
between RRH1 and CU. Also, RRH1 sends the detected
CCA idle status 124 to the CU through its backhaul. RRH2
is detecting that the medium is busy 122.

CU receives the CCA idle status 124 from RRH1, it sends
back Data frames and a control signal 126 to RRH1 which
indicates RRH1 should commence a backoff (BO) proce-
dure. CU also sends a control signal 128 to RRH2 indicating
that RRH2 should not initiate a BO procedure.

RRH1 initiates the BO 130, as per indications in the
received control signal from the CU. Meanwhile, RRH2 is
not performing 132 BO or transmissions. Upon BO 130
timeout (BO value counts down to zero) on the idle medium,
RRH1 commences to transmit Data frames 134. RRH2
continues detecting a busy medium 136 during the time that
RRH1 is transmitting.

5.2. Example 5-2 Using PPDU to Quiet the Medium

Figure 5:
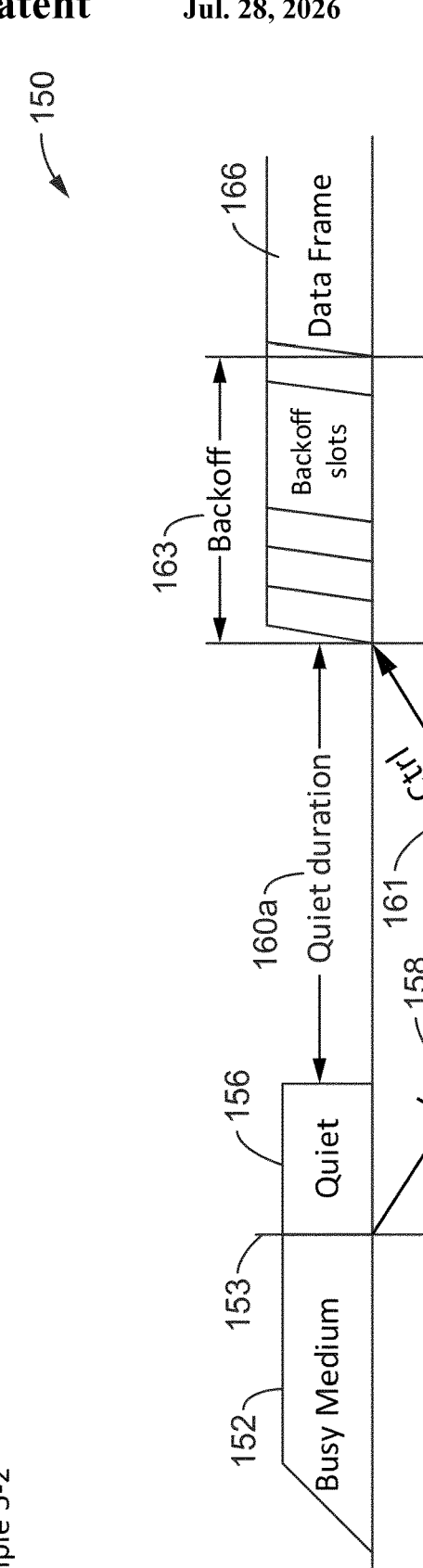
FIG. 5 is a communication diagram (Example 5-2) of RRH sending a PPDU to quiet the medium when completing synchronization with the CU, according to at least one embodiment of the present disclosure.

FIG. 5 illustrates an example embodiment 150 (Example
5-2) of RRH sending a PPDU to quiet the medium when
completing synchronization with the CU. The figure depicts
interactions between RRH1 112, CU 114, and RRH2 116.

The medium is initially busy 152, then RRH1 detects
CCA idle 153, and it broadcasts a PPDU 156 to quiet the
medium for a certain duration, which encompasses at least
a round trip time (RTT) between RRH1 and CU. Also,
RRH1 sends the detected CCA idle status 158 to the CU
through the backhaul.

During this time RRH2 is seeing a busy medium 154,
which is then extended by the PPDU 156 from RRH1.

After receiving the Quiet PPDU, RRH2 and non-AP STAs
which are decoding the PPDU with its quiet information
should respond to it by not initiating channel access within
the specified quiet duration 160a, 160b, unless it receives a
PPDU or other signal from RRH1 or CU that requests an
immediate response.

When the CU receives the CCA idle status 158 from
RRH1, it sends back Data frames and a control signal 161
to RRH1 which indicates RRH1 should start a backoff (BO)
procedure. The CU also sends a control signal 162 to RRH2
indicating that RRH2 should not initiate a BO procedure.

RRH1 initiates the BO procedure 163 as indicated in the
received control signal from the CU and transmits Data
frames 166 after BO timeout (BO value counts down to
zero).

RRH2 responds to receiving the control signal from the
CU by not initiating BO 164, and RRH2 continues detecting
that the medium is busy 168 while RRH1 is transmitting.

6. Backoff for RRH

6.1. New Interframe Space Design

As mentioned in the problem statement section, a new
Inter Frame Space (IFS) timing relationship design has been
utilized in the present disclosure for the RRH with zero BU
to initiate a BO procedure. This new inter-frame space
"XIFS" is described below for meeting this need.

Figure 6:
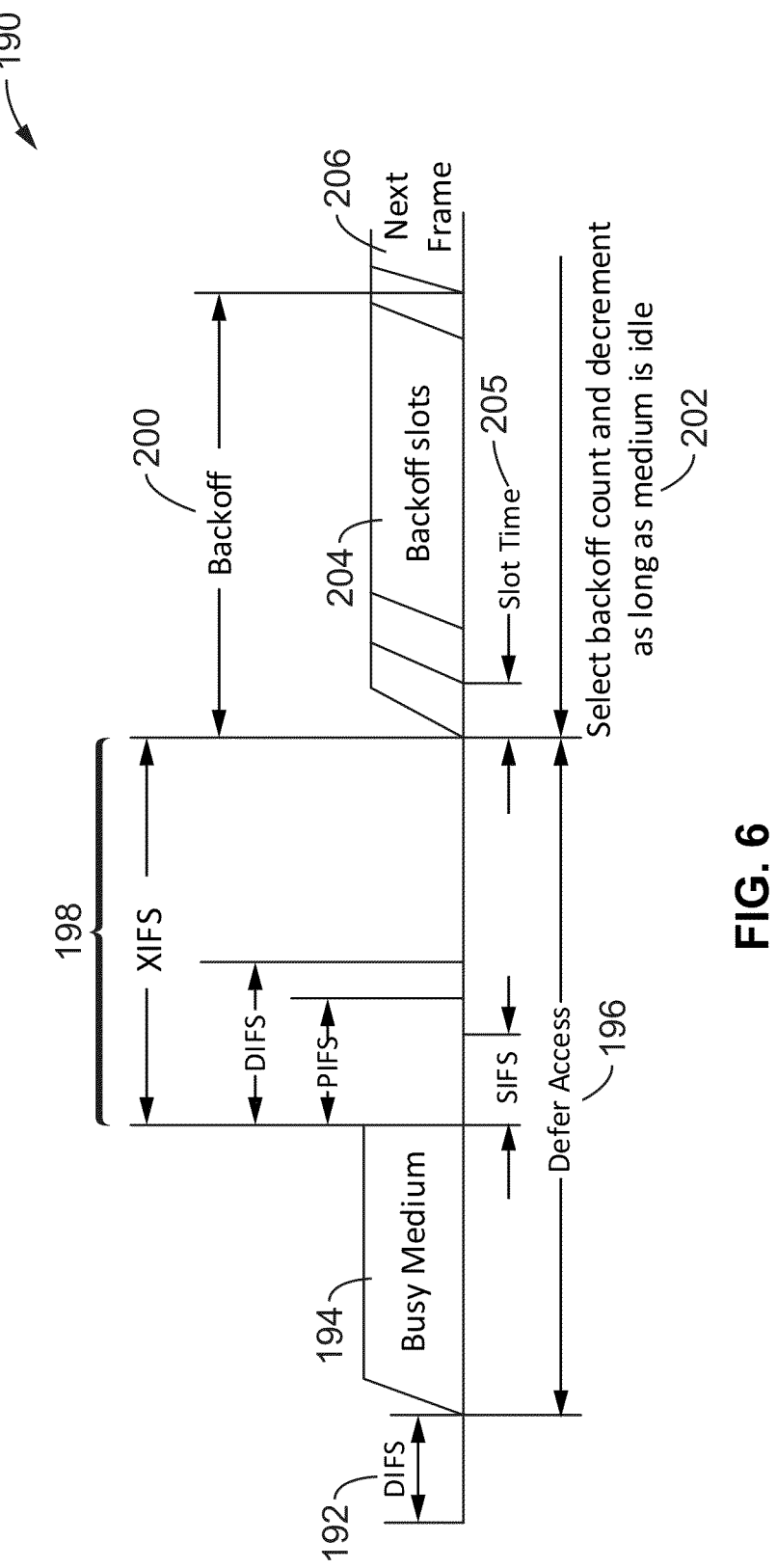
FIG. 6 is a medium access diagram of a new interframe space configuration (XIFS), according to at least one embodiment of the present disclosure.

FIG. 6 illustrates an example embodiment 190 of a new
interframe space configuration.

The figure shows channel access of RRH when the RRH
is zero buffered, this is different from the basic access
method figure in the IEEE specification. A new interframe
space XIFS is designed for RRH to wait before initiating the
BO procedure after detecting that the medium is no longer
busy.

In the figure is seen the DIFS time 192, after which access
is deferred 196. During the deferred access time, the
medium is busy 194 after which a XIFS time 198 is shown
in comparison with SIFs, PIFS, and DIFS, durations. After
the XIFS, then it is time to select a backoff count 202 and
perform decrementing the BO for as long as the medium is
idle. In this example, this results in backoff 200 commencing
with the given number of backoff slots 204, each having a
slot time 205. When the BO is completed, then the next
frame is sent 206.

It will be noted that XIFS=DIFS+aRRHCURoundTripTi-
meDelay; in which aRRHCURoundTripTimeDelay is the
round-trip delay between RRH and CU.

6.2. XIFS Timing Relationship

Figure 7:
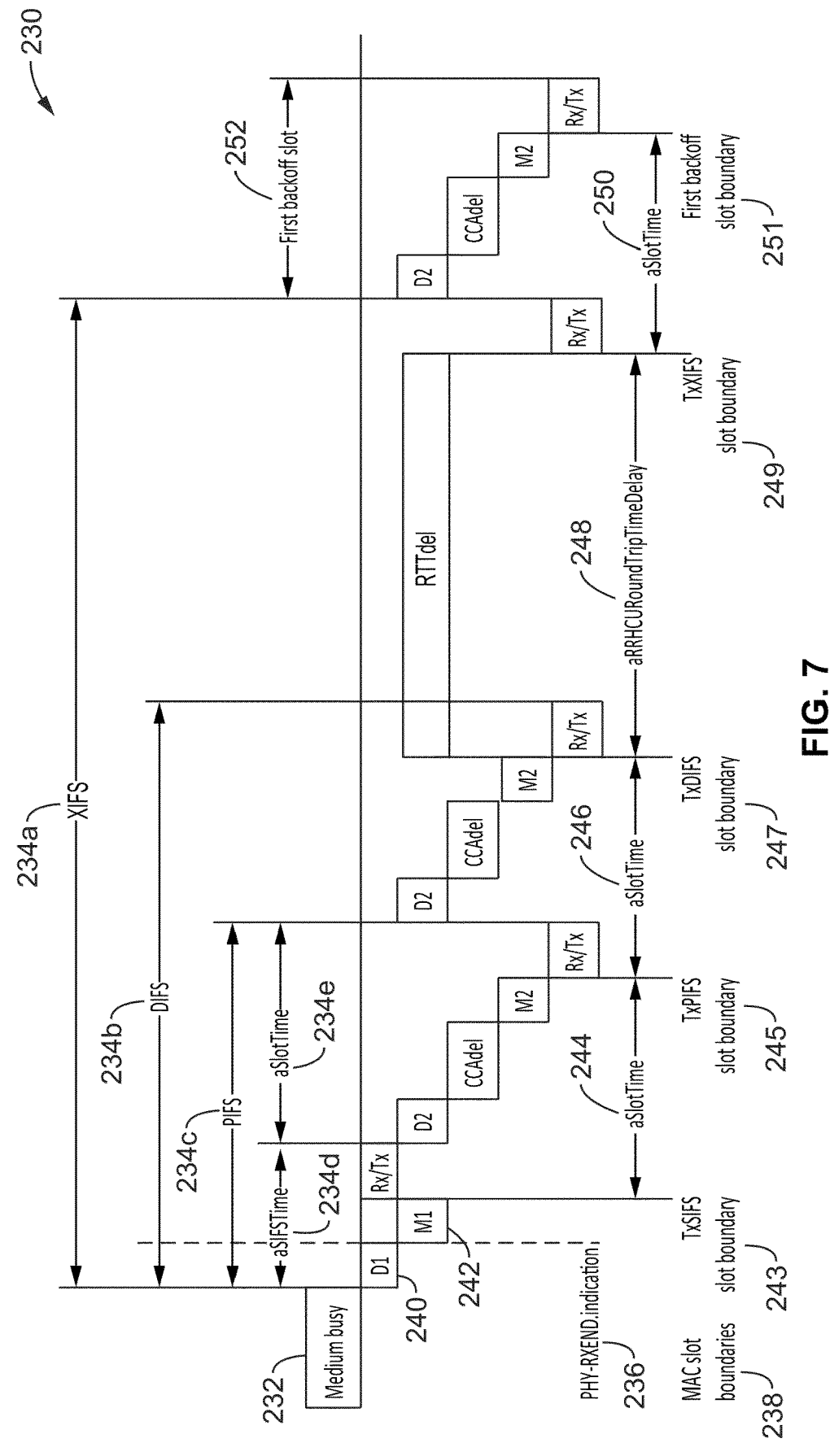
FIG. 7 is a medium access diagram of XIFS timing relationships, according to at least one embodiment of the present disclosure.

FIG. 7 illustrates an example embodiment 230 of the
XIFS timing relationships. Medium is initially busy 232,
then becomes idle and enters IFS timing, with lengths of
XIFS 234a, DIFS 234b, PIFS 234c, and aSIFSTime 234d
followed by aSlotTime 234e. Entering this there is an
RxPHYDelay period (D1) 240 at the end of which is a
PHY-RXEND.indication 236, and entering an M1 period,
which is aMACProcessingDelay. After the M1 period is a
TxSIFS slot boundary 243, which is included in MAC slot
boundaries 238, after which is seen aSlotTime 244 with
Rx/Tx, D2, CCAdel, M2.

Then is seen a TxPIFS slot boundary 245 entering another
aSlotTime 246, shown with Rx/Tx, D2, CCADel, M2. After
which is seen a TxDIFS slot boundary 247 entering another
Rx/Tx. The Rx/Tx duration is also included in the aRRH- CURoundTripTimeDelay 248, which extends the MAC slot boundary to reach the TxXIFS slot boundary 249. Then is seen a TxXIFS slot boundary 249 entering an aSlotTime 250, shown with Rx/Tx which coincides with the end of the XIFS 234*a*, and the start of a First Backoff slot 252, after which is seen D2, CCADel, M2. The aSlotTime ends at first backoff slot boundary 251, then there is seen an Rx/Tx is seen at the end of the first backoff slot 252.

In the figure D1=aRxPHYDelay (as referenced from the end of the last PPDU[+SigExt] on the medium.) D2=aAirPropagationTime. Rx/Tx=aRxTxTurnaroundTime (begins with a PHY-TXSTART.request). M1=M2 −aMACProcessingDelay. CCAdel=aCCATime. RTTdel=aRRHCURoundTripTimeDelay.

7. Example of Processing BO on RRH Side

7.1. Example 7-1 for CU with one Primary RRH

Figure 8:
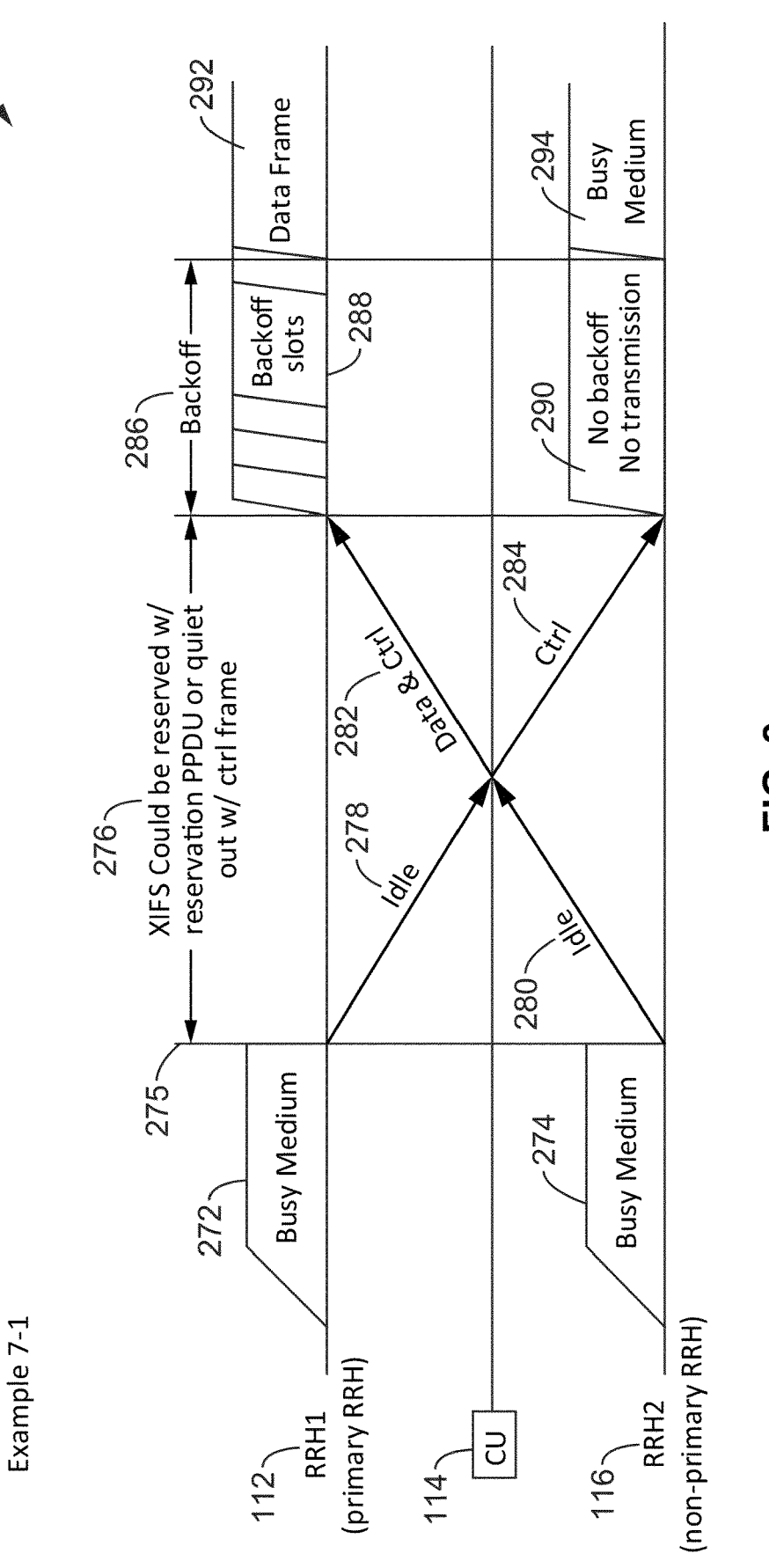
FIG. 8 is a communication diagram (Example 7-1) of a BO procedure for a scenario in which the CU has one pre-determined primary RRH), according to at least one embodiment of the present disclosure.

FIG. 8 illustrates an example embodiment 270 (Example 7-1) of a BO procedure for a scenario in which the CU has one pre-determined primary RRH. The figure depicts interactions between RRH1 112, CU 114, and RRH2 116.

In this example the CU has one pre-determined primary RRH, herein exemplified as being RRH1, which performs the BO procedure. The other RRHs connected with the same CU, as shown in this example as RRH2, are non-primary RRH(s) and do not perform a BO during this time period.

RRH1 and RRH2 both detect busy medium 272, 274 at the beginning, before detecting CCA idle 275 at the start of a time in which a XIFS period 276 can be reserved using a reservation PPDU or a quiet period started with a control frame. Upon recognizing CCA idle, both RRHs send an idle status 278, 280, to the CU.

RRH1 is a pre-determined primary RRH, and it may reserve the channel for a XIFS duration 276 with a reservation PPDU or with broadcasting a PPDU carrying quiet information.

The CU receives CCA idle status from RRH1 and RRH2, and in response the CU sends Data 282 to RRH1. The Data transmission in some circumstances can include a control signal in 282 from the CU to RRH1 indicating that RRH1 is selected as the primary RRH and should initiate the BO procedure. In some cases, the CU also sends a control signal 284 to RRH2 to indicate that RRH2 is not selected as the primary RRH, and should not initiate a BO procedure nor start transmission without first receiving a signal from the CU.

The Data and Control signals arrive at the RRHs, then RRH1 initiates BO procedure 286 shown with backoff slots 288, and upon BO timeout RRH1 sends Data 292.

During RRH1 BO, RRH2 does not initiate 290 a BO procedure and also does not transmit anything in the channel as the medium is busy 294.

7.2. Example 7-2, for RRH w/Zero BO and w/Primary RRH

Figure 9:
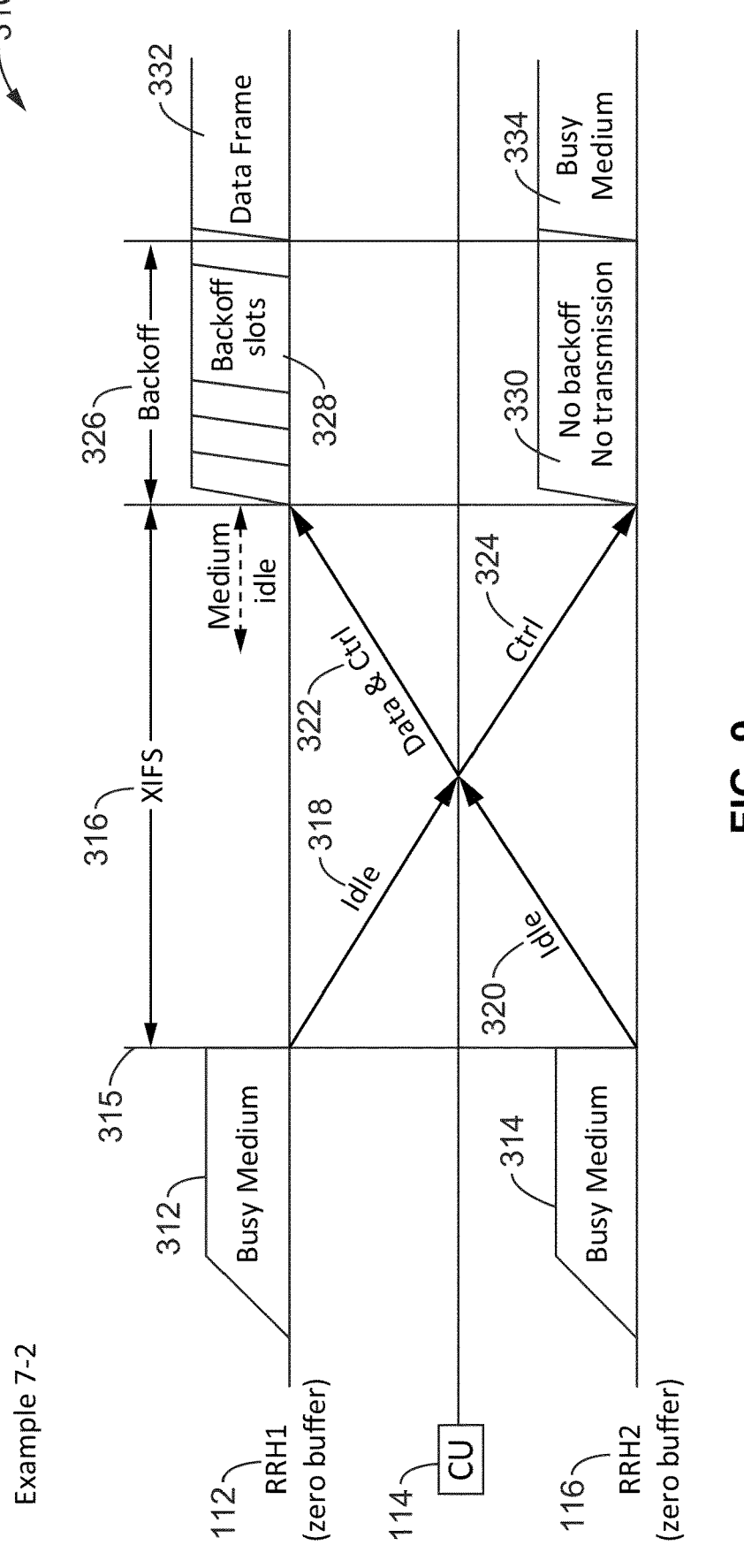
FIG. 9 is a communication diagram (Example 7-2) of a BO procedure in which the RRH has zero Buffer Units (BU) and is without a primary RRH being specified, according to at least one embodiment of the present disclosure.

FIG. 9 illustrates an example embodiment 310 (Example 7-2) of a BO procedure in which the RRH has zero Buffer Units (BU) and is without a primary RRH being specified. The figure depicts interactions between RRH1 112, CU 114, and RRH2 116.

CU has two RRHs (RRH1 and RRH2) connected to it and doesn't have any primary RRH; whereby RRH1 and RRH2 are to perform their BO procedures independently.

Both RRH1 and RRH2 have zero BUs, and both initially detect a busy medium 312, 314. Then the medium becomes idle 315 and a XIFS period 316 starts. Both RRH1 and RRH2 send Idle status 318, 320 to the CU.

The CU receives CCA idle status from RRH1 and RRH2, and the CU selects RRH1 to transmit Data, thus it sends Data 322 to RRH1. In at least one embodiment, the CU also sends a control signal(s) to RRH1 to indicate that RRH1 is selected to initiate the BO procedure and transmit Data. In at least one embodiment, the CU sends a control signal 324 to RRH2 to indicate that RRH2 is not selected to transmit Data, and thus RRH2 should not invoke the BO procedure.

The Data and Control signals from the CU arrive at the RRHs. In response to this, RRH1 initiates a BO procedure 326 (shown with slots 328) when it is detected that the medium is idle for a certain duration, e.g., DIFS. Upon BO timeout RRH1 transmits a data frame 332. RRH2 doesn't initiate 330 any BO procedure and doesn't transmit anything in the busy channel 334.

7.3. Example 7-3 for Non-Zero Buffered RRH1

Figure 10:
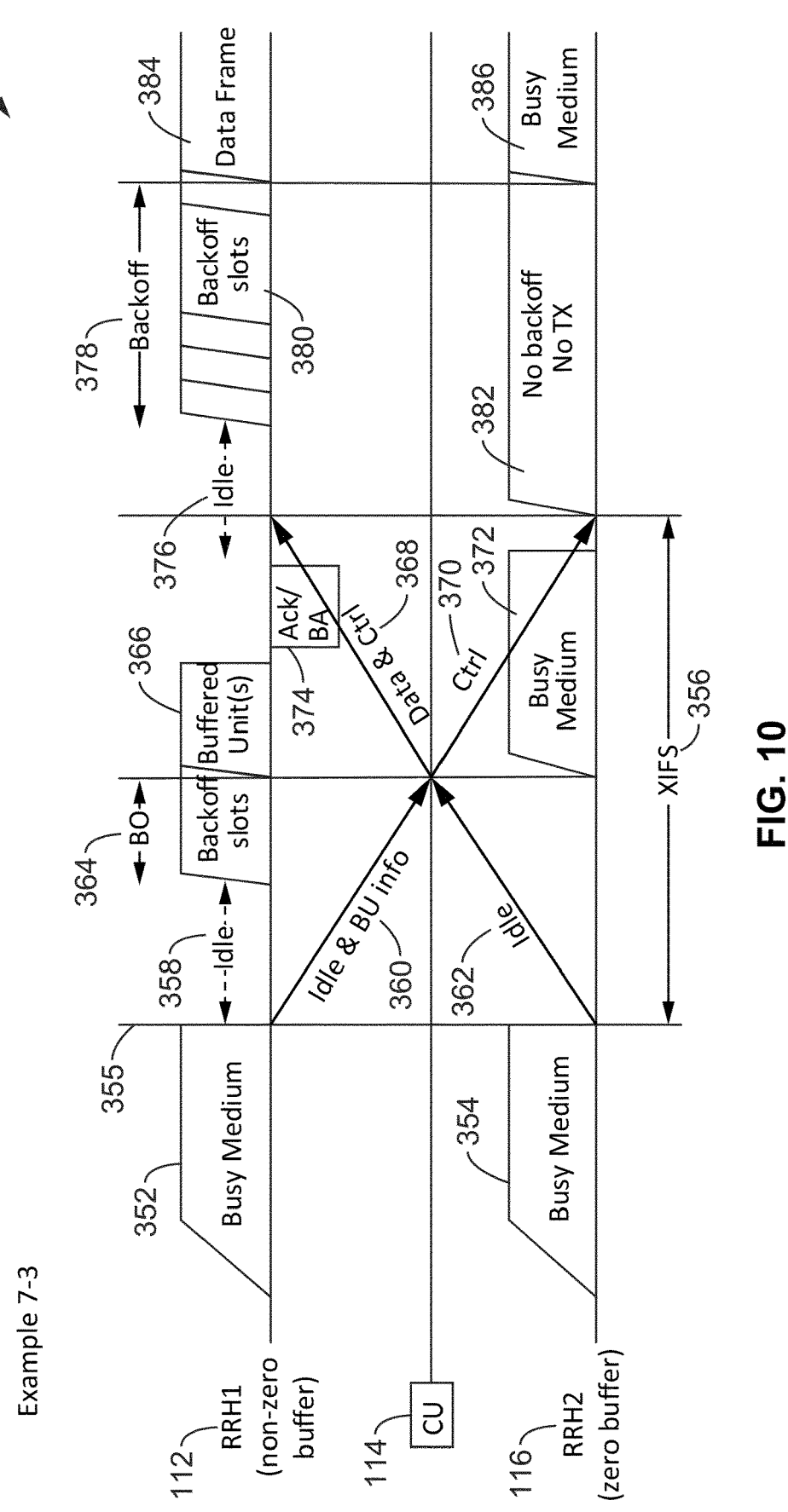
FIG. 10 is a communication diagram (Example 7-3) of non-zero buffered RRH1 finishing its Transmit Opportunity (TXOP) before XIFS expiration and initiating a new BO procedure when new Data arrives, according to at least one embodiment of the present disclosure.

FIG. 10 illustrates an example embodiment 350 (Example 7-3) of non-zero buffered RRH1 finishing its Transmit Opportunity (TXOP) before XIFS expiration and initiating a new BO procedure when new Data arrives. The figure depicts interactions between RRH1 112, CU 114, and RRH2 116.

In this example there is no pre-defined primary RRH, and RRH1 and RRH2 attempt to perform their BO procedures independently.

RRH1 has Buffered Units (BUs), RRH2 has zero BUs. Initially RRH1 and RRH2 detect the medium being busy 352, 354. Then as the medium becomes idle 355, at the start of XIFS period 356, at which time both RRH1 and RRH2 detect CCA idle 358, and both send the idle status 360, 362 to the CU. In addition, RRH1, in certain instances, can also send the BU information 360 to the CU.

Since RRH1 has BUs, whose lifetimes are still valid, RRH1 can initiate a BO procedure 364 after detecting that the medium has been idle for a certain time, such as a DIFS time. RRH1 can transmit BUs 366 after BO timeout and receive Ack/BO 374 from the receiver. The frame exchanges may be completed before the end of the XIFS time 356. While RRH1 transmits or receives frames, RRH2 detects that the medium is busy 372.

Returning back to further consider the XIFS period 356, the CU receives CCA idle status from both RRHs and may receive information on BUs from RRH1. The CU should select at least one RRH to transmit Data frames. In this present example, the CU selects RRH1 to transmit Data, and thus passes Data 368 to RRH1. In at least one embodiment/mode/option the CU also sends a control message 368 to RRH1 indicating whether or not RRH1 has completed the frame exchanges before the end of XIFS. Then in response to detecting that CCA medium has been idle for a certain period 376, such as a DIFS time, RRH1 can commence a new BO procedure 378, with BO slots 380. In at least one embodiment/mode/type the CU sends another control message 372 to RRH2 indicating that RRH2 should not initiate a BO procedure, to which RRH complies 382 as no BO or transmissions are performed.

After completing its BO, RRH1 sends Data frames 384 after BO timeout and should receive an Ack/BO (not shown). RRH2 receives the control message from CU and does not invoke 382 BO procedure based on the control message from the CU, after which it detects a busy medium 386.

7.4. Example 7-4 Non-Zero Buffered RRH Unable to Finish

Figure 11:
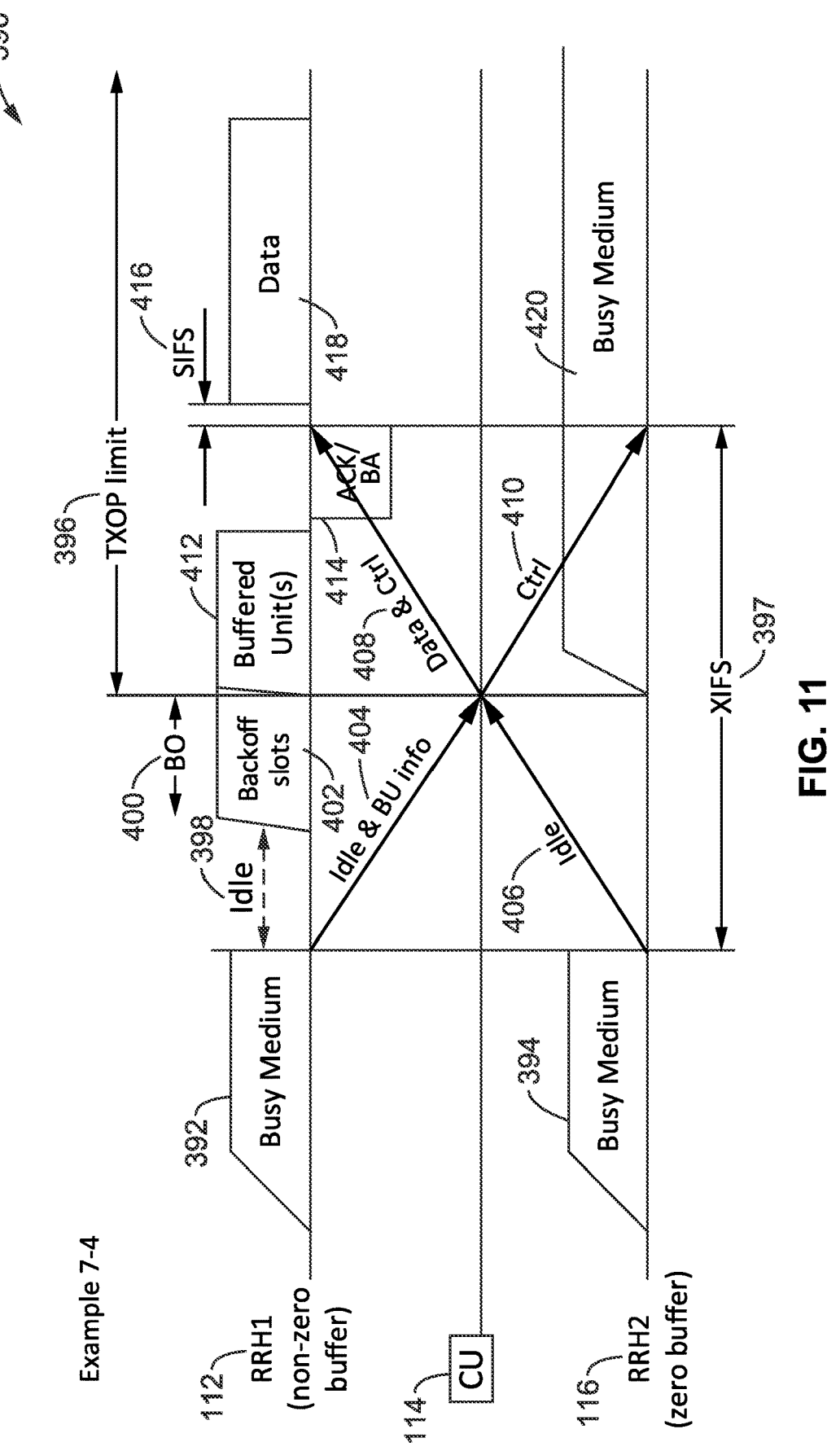
FIG. 11 is a communication diagram (Example 7-4) of non-zero buffered RRH1 which is unable to complete its frame exchange before XIFS expiration and not able to commence a new BO procedure when Data arrives, according to at least one embodiment of the present disclosure.

FIG. 11 illustrates an example embodiment 390 (Example 7-4) of a non-zero buffered RRH1 which is unable to complete its frame exchange before XIFS expiration and is not able to commence a new BO procedure when Data arrives. The figure depicts interactions between RRH1 112, CU 114, and RRH2 116; there is no pre-defined primary RRH, whereby RRH1 and RRH2 perform their BO procedures independently.

RRH1 has buffered units (BUs), while RRH2 has zero BUs. Initially the medium is detected as being busy 392, 394, after which RRH1 and RRH2 detect CCA idle 398 within XIFS 397, and both RRH1 and RRH2 send the idle status 404, 406, to the CU. In addition to the idle status, RRH1 may also send the BU information to the CU. The determination of whether or not this BU information is sent is an application dependent option, which is beyond the scope of this disclosure. It should be noted that the RRH may determine that the CU should recognize its buffer status, so that the CU will be able/inclined to select it as the primary RRH, but the manner in which the CU schedules the following procedure is a decision left to the CU for its specific application.

Since RRH1 has BUs that are still valid (lifetime has not expired), RRH1 initiates a BO procedure 400, with slots 402, after detecting medium idle for a certain length of time, such as a DIFS time. RRH1 can transmit BUs 412 after BO timeout and receive an Ack/BA 414. These frame exchanges should not extend beyond the end of XIFS time 397, nor violate the TXOP limitation 396. While RRH1 is transmitting and/or receiving frames 412, RRH2 detects medium busy 420.

In response to the CU receiving the CCA idle status from both RRHs, and possibly BU information from RRH1, the CU selects at least one RRH to transmit Data frames. In this example, the CU selects RRH1 to transmit Data, thus it passes Data 408 to RRH1. The CU may also send a control message 408 to RRH1 indicating if RRH1's frame exchanges approach the end of XIFS, whereby RRH1 may not be required to initiate a new BO procedure. RRH1 can continue transmitting the newly received Data from the CU using the obtained TXOP. The CU should send another control message 410 to RRH2 to indicate that the RRH2 should not initiate a BO procedure.

RRH1 receives the Data and control message from the CU, and thus initiates a transmission of Data frames 418 after a certain period, such as a SIFS time 416 without processing a BO procedure insofar as it doesn't exceed the TXOP limitation. According to the control message from the CU, RRH1 should not surpass the end of the TXOP limit 396 when it transmits Data 418.

RRH2 receives the control message 410 from the CU and does not invoke a BO procedure based on control message from the CU, and still is detecting a busy medium 420.

7.5 Example 7-5, w/Non-Zero BUs Performing BO During XIFS

Figure 12:
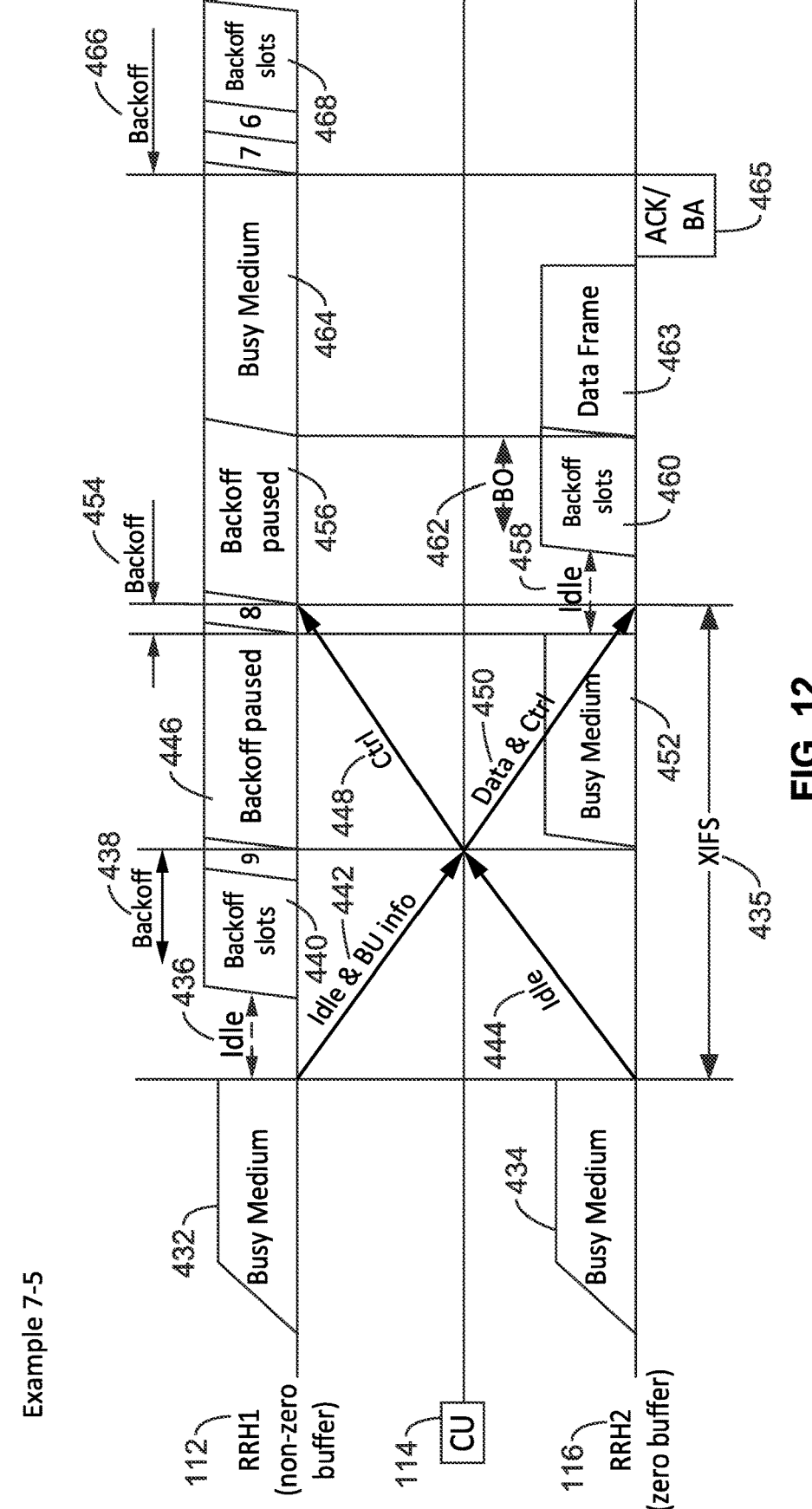
FIG. 12 is a communication diagram (Example 7-5) of an RRH having Buffer Units (BUs), with RRH1 performing BO during XIFS, but is not selected by the CU to transmit Data, according to at least one embodiment of the present disclosure.

FIG. 12 illustrates an example embodiment 430 (Example 7-5) of an RRH having Buffer Units (BUs), also referred to as a state of non-zero BU. RRH1 performs a BO during XIFS, but is not selected by the CU to transmit Data. The figure depicts interactions between RRH1 112, CU 114, and RRH2 116, yet there is no pre-defined primary RRH, whereby RRH1 and RRH2 independently perform their BO procedures.

RRH1 has buffered units (BUs), while RRH2 has zero BU. Initially the medium is busy 432, 434. Then at some point RRH1 and RRH2 detect CCA idle 436, and both send an idle status 442, 444, to the CU. In addition, RRH1 may also send BU information 442 to the CU. The CU receives the CCA idle status from both RRHs and may receive BU information from RRH1.

Since RRH1 has BUs with a valid lifetime, RRH1 can initiate a BO procedure 438 after detecting that the medium has been idle 436 for a certain time, such as a DIFS time. While RRH1 is counting down the BO 438 of BO slots 440 down to a value, such as 9 as seen in this example, interference occurs, and the medium becomes busy. RRH2 detects medium busy 452. When RRH1 detects medium busy it pauses 446 its BO counter. The interference ends (is finished), before the end of XIFS, wherein RRH1 continues backoff 436 and counts down its BO value, exemplified as reaching a value of 8 and continuing to be counted down.

The CU selects at least one RRH to transmit Data frames. In this example, the CU selects RRH2 to transmit Data, thus it passes Data 450 to RRH2. RRH1 receives a control message 448 from the CU which indicates it is to suspend its BO counter, wherein BO is shown as paused 456, exemplified here as occurring after it had started BO 454 and counted down from 9 to 8.

The CU may also send a control message 450 to RRH2 indicating RRH2 should start its BO procedure if it has detected medium idle 458 for a certain period, such as a DIFS time.

RRH2 receives the Data and control messages from the CU, thus initiates BO procedure 462 with BO slots 460 after detecting medium idle 458 for a certain period, such as a DIFS time. RRH2 sends the Data frames 463 after the BO timeout and receives an Ack/BA 465 for the transmission.

RRH1 has paused 456 its BO counter after receiving the control message from the CU, and recognizes that the medium is busy 464 whereby it moves to an idle state. After this time of RRH2 transmission and reception, RRH1 resumes BO 466, with the counter continuing to count down its backoff slots 468, seen continuing the count down from 7 to 6 and so forth.

7.6. Example 7-6, CU Scheduling Shared TXOP for Multiple RRHs

Figure 13:
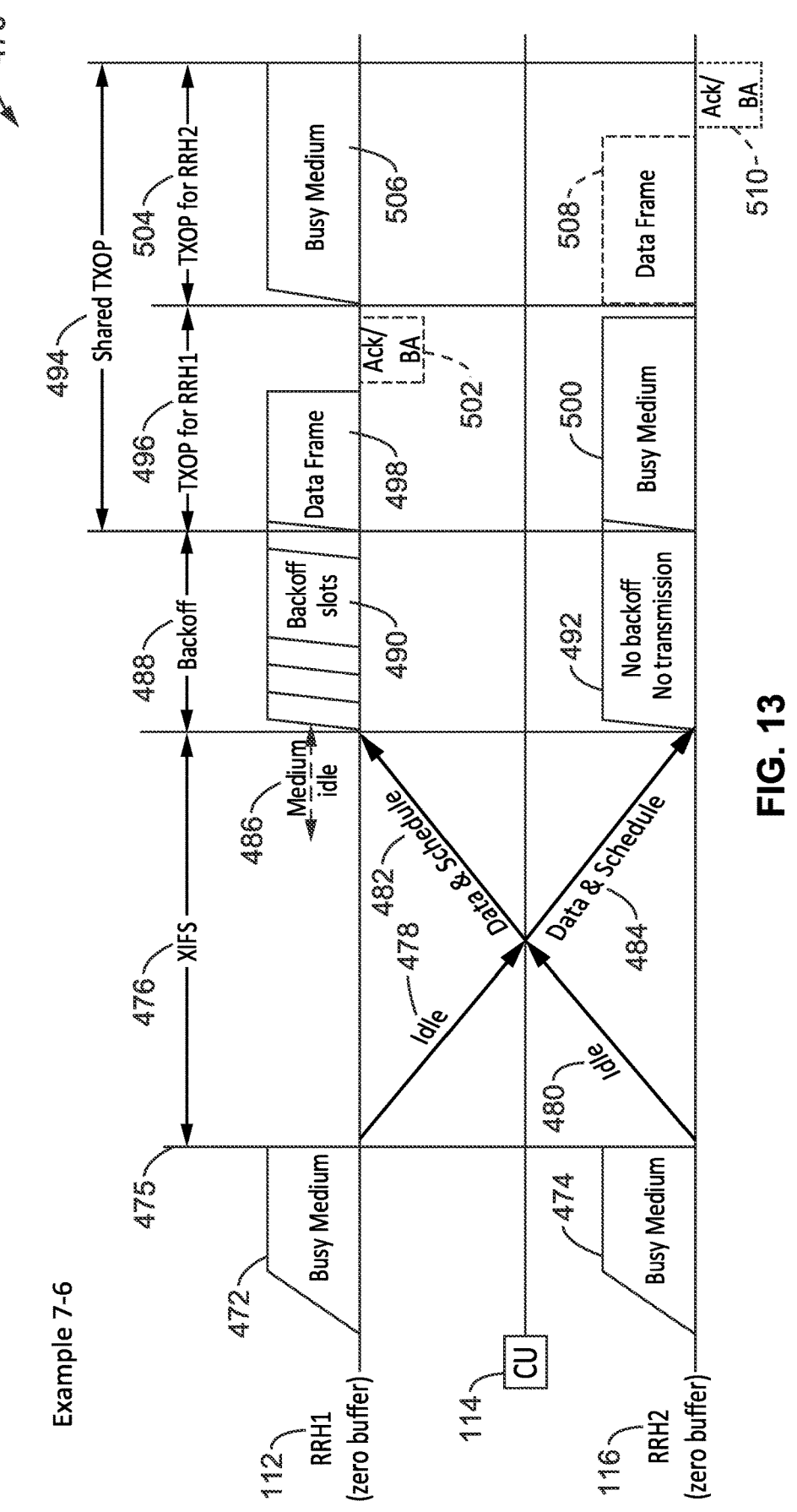
FIG. 13 is a communication diagram (Example 7-6) of the CU scheduling a shared TXOP for multiple RRHs, according to at least one embodiment of the present disclosure.

FIG. 13 illustrates an example embodiment 470 (Example 7-6) of the CU scheduling a shared TXOP for multiple RRHs. The figure depicts interactions between RRH1 112, CU 114, and RRH2 116. RRH1 and RRH2 both are without any buffer units (zero BU).

The medium is initially busy 472, 474, after which RRH1 and RRH2 detect CCA idle 475, at the start of a XIFS time period 476. In response to detecting the idle medium, both RRH1 and RRH2 send an idle status message 478, 480 to the CU, which is received by the CU from both RRHs.

The CU may decide to schedule a shared TXOP 494 for multiple RRHs and send Data and scheduling messages 482, 484, to each of the RRHs, respectively. In at least one embodiment/mode/option, the scheduling message indicates the allocated resources, such as time and/or Resource Units (RUs) or Multiple Resource Units (MRUs) for each RRH.

In this example, the CU schedules RRH1 and RRH2 to use the shared TXOP in order, with the CU passing Data and the scheduling message to RRH1 and RRH2.

RRH1 receives Data and control message 482 from the CU, and starts to initiate a BO procedure 488 after detecting medium idle 486 for a certain period, such as a DIFS time. During this time RRH2 does not perform 492 a BO or transmissions. RRH1 performs its BO 488 with BO slots 490, then the TXOP 494 commences as RRH1 sends Data frames 498 during TXOP portion 496 for RRH1, and receives an Ack/BA 502. Thus, RRH1 uses its allocated time in the shared TXOP. During this time RRH2 is detecting a busy medium 500.

RRH2 receives Data and control message 484 from the CU, yet it awaits until its allocated time in the shared TXOP 494 begins. Then during its TXOP portion 504 is sends Data frame(s) 508, without requiring a BO procedure, and in response to the transmission receives Ack/BA 510. During this time RRH1 is detecting a busy medium 506.

7.7. Example 7-7, Processing BO on the CU Side

Figure 14:
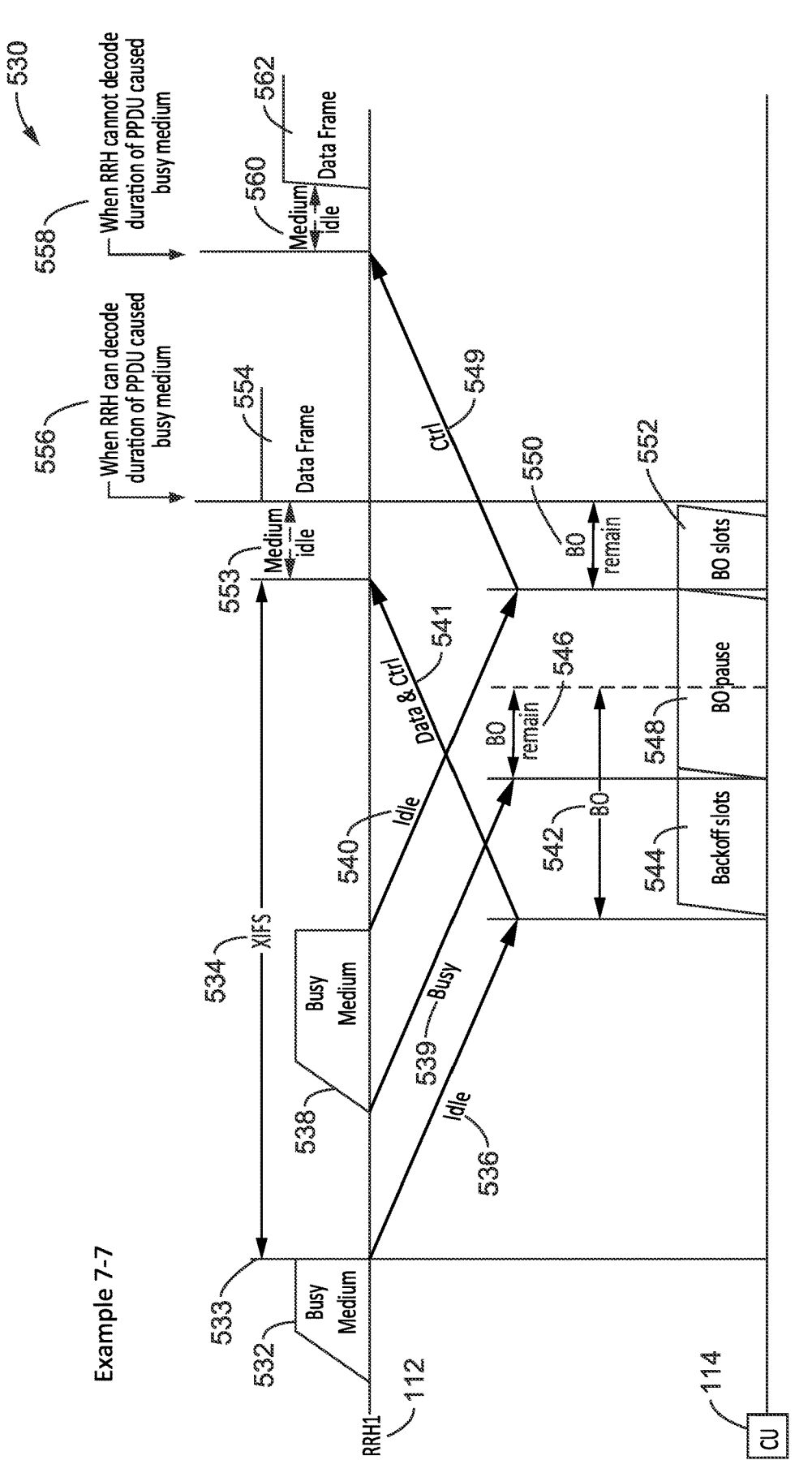
FIG. 14 is a communication diagram (Example 7-7) in which the CU has one BO for all connected RRH and sends Data to RRH before BO timeout, according to at least one embodiment of the present disclosure.

FIG. 14 illustrates an example embodiment 530 (Example 7-7) in which the CU has one BO for all connected RRH and sends Data to RRH before BO timeout. The figure depicts interactions between RRH1 112 and CU 114.

Although a CU is connected with multiple RRHs, in this example it is shown only using RRH1 to represent the general performance of all connected RRHs. In the figure the medium is initially busy 532, after which RRH1 112 detects CCA idle 533, and a XIFS period 534 starts, with RRH sending the idle status 536 to CU 114.

In response to the idle status, the CU sends a Data and control message 541 to RRH1, and starts a BO 542 with slots 544, for use in controlling RRH1 access to the channel. The control message 541 to RRH1 indicates the initial BO value. However, before receiving Data and the control message 541, RRH1 detects that the medium is busy 538, and it immediately sends CCA busy status 539 to the CU. The CU receives the CCA busy status 539 before the BO timeout, and pauses the BO procedure 542, with a portion of the BO 546 still remaining.

RRH1 then detects the medium moving back to an idle state and immediately sends another CCA idle status 540 to the CU. The CU responds to the CCA idle status from RRH1 by immediately resuming the BO procedure 552 with the remaining BO time slots 550 and sends a control message 549 to RRH1 indicating the updated BO value.

RRH1 finally receives Data and the control message 541 indicating the initial BO value. After the medium idle time 553, if RRH1 can decode 556 the PPDU duration of PPDU causes medium busy, then RRH1 should estimate the BO timeout on the CU with the knowledge of initial BO value, XIFS duration and the PPDU duration. In this case, RRH1 should transmit Data 554 after the estimated BO timeout and with detecting the medium idle 553 for a certain duration.

If RRH1 is unable to decode the PPDU duration of PPDU which is causing the medium busy situation, then RRH1 awaits receiving 558 the next control message from the CU indicating the updated BO value. Upon receiving control message 549, RRH1 waits a medium idle time 560 and commences to transmit Data 562.

7.8. Example 7-8, CU With One BO for All Connected RRHs

Figure 15:
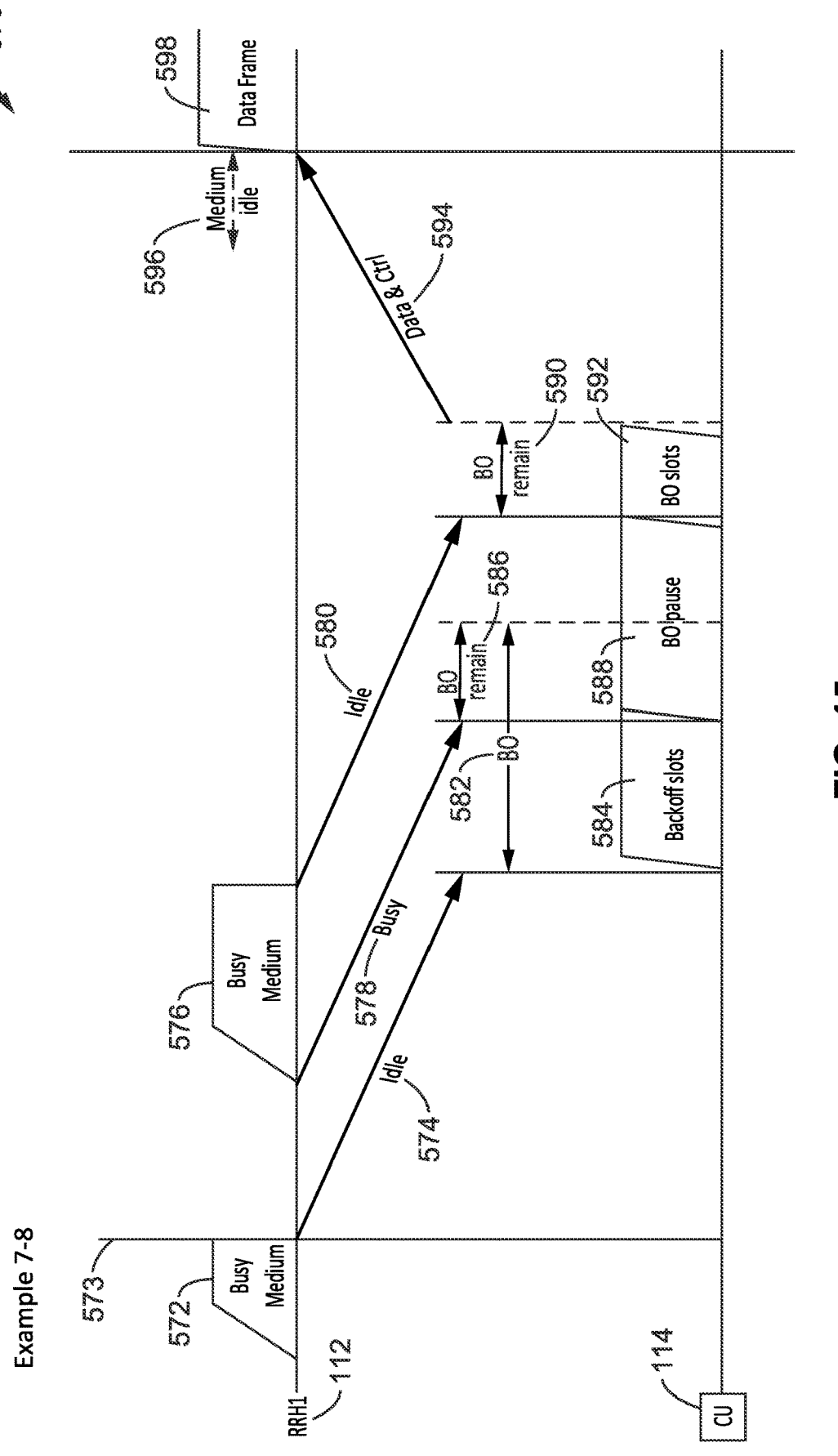
FIG. 15 is a communication diagram (Example 7-8) of a case in which the CU has one BO for all connected RRHs and sends Data to the RRH after it determines a proper BO timeout, according to at least one embodiment of the present disclosure.

FIG. 15 illustrates an example embodiment 570 (Example 7-8) of a case in which the CU has one BO for all connected RRHs and sends Data to the RRH after it determines a proper BO timeout. The figure depicts interactions between RRH1 112 and CU 114. The CU is connected with multiple RRHs, in this example it only uses RRH1 to represent the general performance of all connected RRHs.

Initially the medium is seen as being busy 572, then RRH1 detects CCA idle 573, and it sends an idle status 574 to the CU. Upon receiving this idle status, the CU starts performing a BO 582 with backoff slots 584.

However, before RRH1 receives Data and control message from the CU, RRH1 again detects a busy medium 576, and thus sends a CCA busy status 578 to the CU immediately. The CU, having received the CCA busy status before the BO timeout, pauses 588 the BO procedure with a BO count 586 remaining.

RRH1 then detects that the medium is no longer busy and sends a CCA idle status 580 to the CU. Upon the CU receiving the CCA idle status from RRH1, the CU immediately resumes the BO procedure 592 with the remaining BO slots 590. After BO 592 is completed, the CU sends Data and a control message 594 to RRH1. The control message may indicate the BO timeout (BO value is 0), or indicate that the RRH should start a Data transmission if it has detected that the medium has been idle for a certain time, or indicates the time duration over which the RRH should continue detecting the medium state, if it hasn't already detected medium idle for that certain time after receiving the control message from CU.

RRH1 receives Data and the control message 594, indicating that RRH1 should transmit Data after detecting that the medium is idle for a certain duration 596, upon which RRH1 transmits Data frame 598.

7.9. Example 7-9, CU Maintains BO for Each Connected RRH

Figure 16:
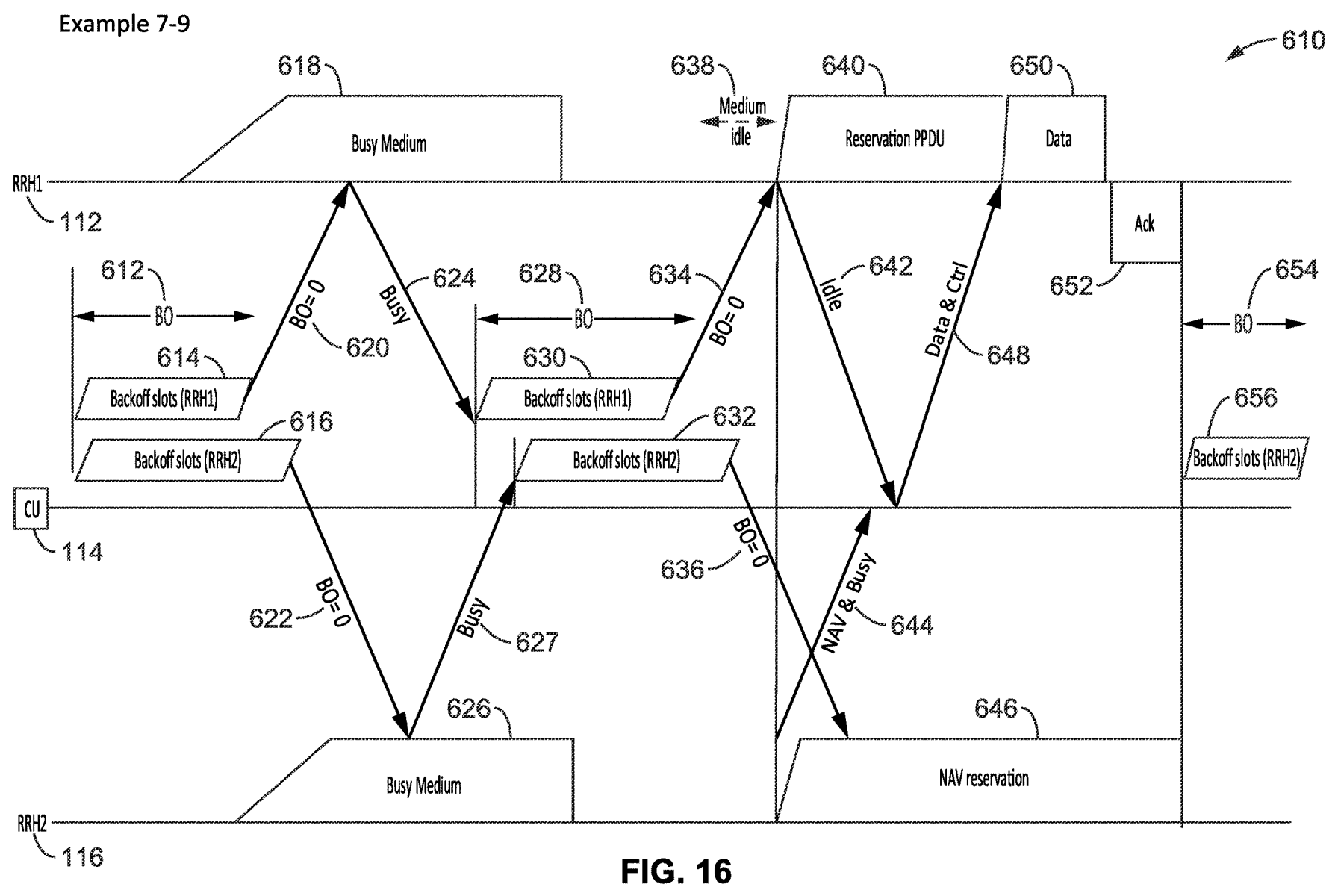

FIG. 16 illustrates an example embodiment 610 (Example 7-9) in which the CU maintains the BO for each connected RRH and invokes the BO before receiving CCA status from RRHs. The figure depicts interactions between RRH1 112, CU 114, and RRH2 116. The CU in this example performs BO procedures independently for RRH1 and RRH2. The CU can invoke each BO procedure before receiving the CCA idle status from the corresponding RRH, which were shown as BO (RRH1) and BO (RRH2) on CU.

The CU is performing the BOs 612, with backoff slots 614 for RRH1, and backoff slots 616 for RRH2. The CU signals an RRH when the corresponding BO time has timed out (BO value=0). BO messages are seen being sent to RRH1 620 and at RRH2 622. However, the medium is busy 618, 626 at both RRH1 and RRH2, respectively. Each RRH receives this BO timeout message while detecting medium busy; yet neither RRH knows the duration of the PPDU which caused the medium to become busy, and thus each RRH immediately sends a message indicating CCA busy 624, 627.

Upon the CU receiving the CCA busy information it should restart the BO for the corresponding RRH. In this example the CU receives busy message 624 first, and the CU starts a new BO 628 with BO slots 630. Then upon receiving busy message 627 from RRH2, the CU starts backoff slots 632 for RRH2.

Then the CU signals RRH1 and RRH2 again when their corresponding BO timeout is reached. In this example, RRH1 has detected medium idle 638 for a certain time when it receives BO timeout message 634. RRH1 then transmits a reservation PPDU 640 to reserve the medium and sends an idle message 642 to the CU. During the reservation PPDU duration, CU and RRH1 should finish synchronizing CCA status and the CU passes Data and/or control signals 648 to RRH1. RRH1 should transmit the Data 650 in the TXOP which has been reserved by the reservation PPDU 640. After which a Ack 652 is received by RRH1 from the recipient of Data 650.

At this time RRH2 has not received a BO timeout message yet, and it detects medium busy and NAV reservation 646. So RRH2 is not to access the channel and sends CCA busy and NAV 644 to the CU. After this RRH2 receives backoff timeout message 636, and detects CCA busy (from the reservation PPDU) and it decodes the NAV reservation 646 duration from the PPDU sent by RRH1, which is not addressed to it. The CU receives the CCA busy and NAV reservation from RRH2 and should restart BO 654 with backoff slots 656 for RRH2 after the reserved duration.

7.10. Example 7-10, CU Invokes BO after CCA Status From RRH

Figure 17:
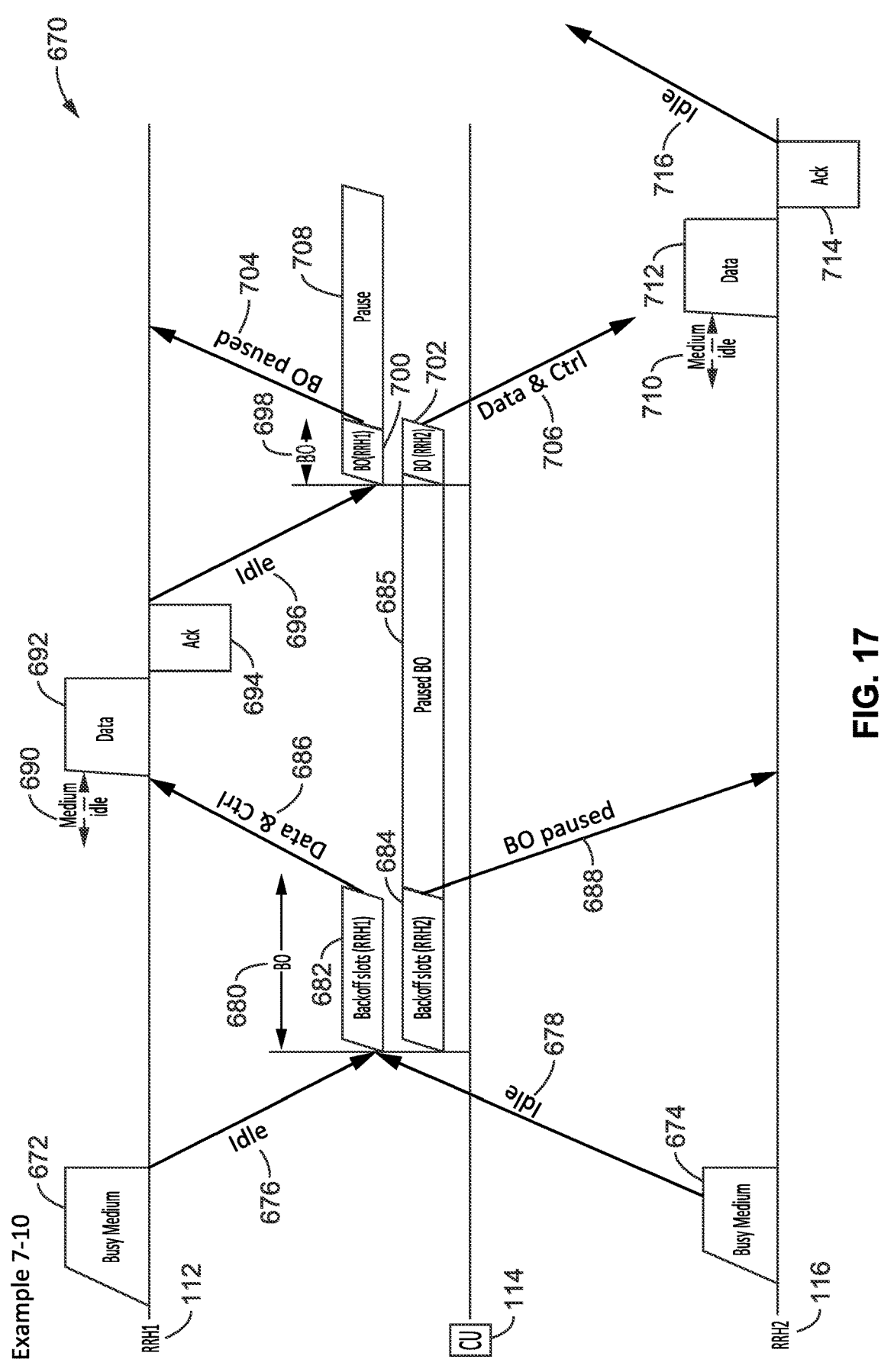
FIG. 17 is a communication diagram (Example 7-10) of the CU maintaining BO for each connected RRH and commencing a BO after receiving CCA status from the RRHs, according to at least one embodiment of the present disclosure.

FIG. 17 illustrates an example embodiment 670 (Example 7-10) of the CU maintaining BO for each connected RRH and commencing a BO after receiving CCA status from RRHs. The figure depicts interactions between RRH1 112, CU 114, and RRH2 116. The CU performs a BO procedure independently for RRH1 and RRH2. The CU can invoke each BO procedure after receiving the CCA idle status from the corresponding RRH, which were shown as BO (RRH1) and BO (RRH2) on CU.

Initially the mediums are busy 672, 674, then RRH1 and RRH2 detect that the medium is idle, and they send a CCA idle status 676, 678, to the CU. The CU receives the idle status from RRH1 and RRH2, and initiates BOs 680 with the specific BO slots 682 for RRH1 and BO slots 684 for RRH2 independently.

The BO for RRH1 is the first to count down to zero, and the CU pauses 685 the BO timer for RRH2 and sends Data and control message 686 to RRH1 indicating RRH1 should initiate Data transmission. The CU can also send a BO paused message 688 to RRH2.

RRH1 receives Data and the control message and should transmit Data 692 when the medium has been idle 690 for a specified duration. RRH1 then receives an Ack 694 for its transmission. Then, RRH1 signals the CU of its idle status after completing its communication. The CU on receiving this signal from RRH1, resumes BOs 698 by continuing backoff slots 702 for RRH2 and restarting the BO slots 700 for RRH1.

Then the BO for RRH2 first counts down to zero, and the CU pauses 708 the BO timer for RRH1, and sends a Data and control message 706 to RRH2 indicating that RRH2 should initiate a Data transmission. RRH2 receives Data and the control message 706 and transmits Data 712, when the medium has been idle 710 for a sufficient duration. RRH2 then receives an Ack 714.

RRH2 should signal the CU of an idle medium 716 after transmission or reception is completed. The CU receives this signal from RRH2 and should then resume the BO timer for RRH1 (not shown) and restart the BO timer for RRH2.

7.11. Example 7-11, CU Invokes BO at End of Estimated TXOP

Figure 18:
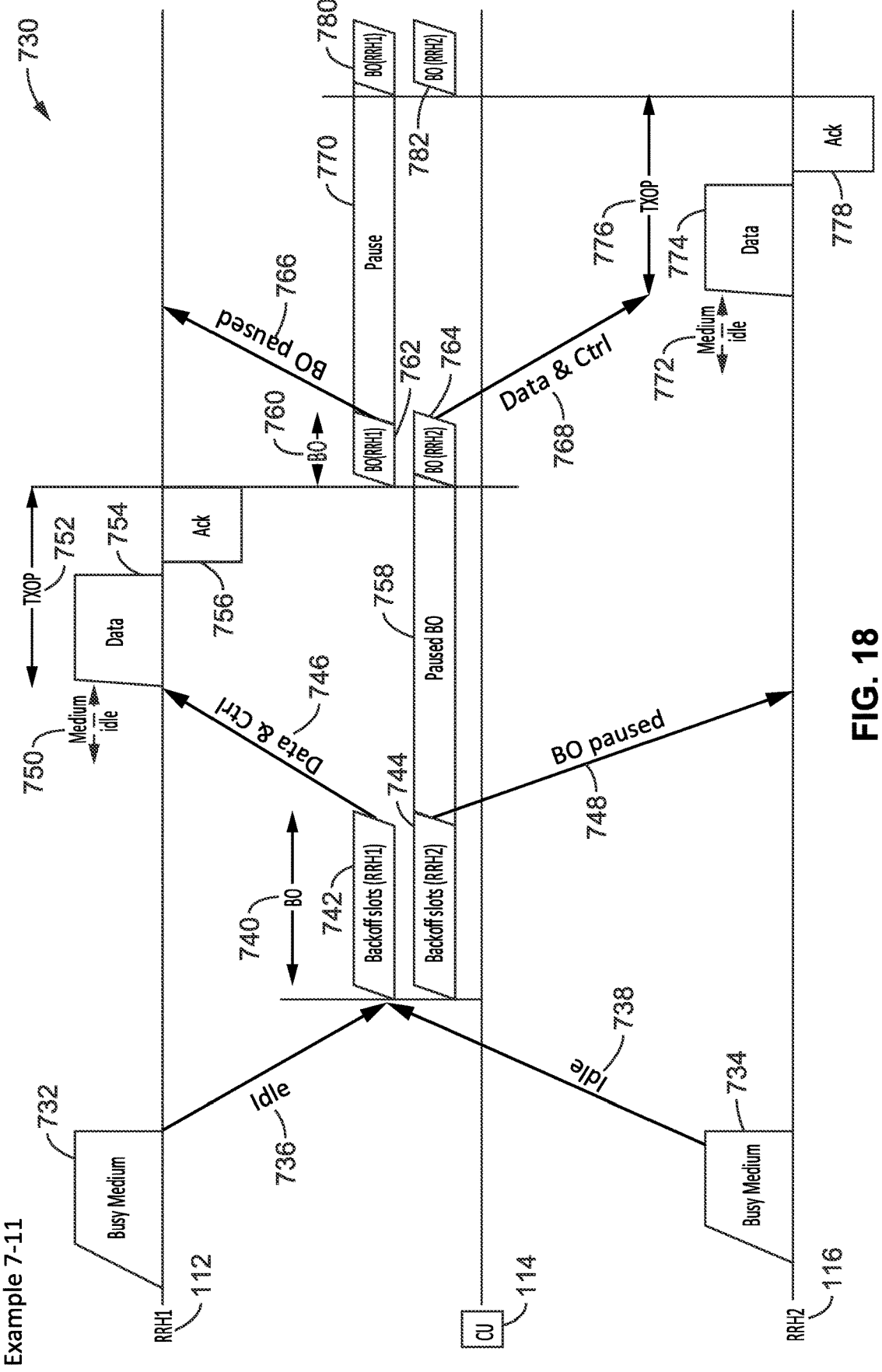
FIG. 18 is a communication diagram (Example 7-11) of the CU maintaining BOs for each connected RRH and invoking BO at the end of an estimated TXOP, according to at least one embodiment of the present disclosure.

FIG. 18 illustrates an example embodiment 730 (Example 7-11) of the CU maintaining BOs for each connected RRH and invoking BO at the end of an estimated TXOP. The figure depicts interactions between RRH1 112, CU 114, and RRH2 116. The CU performs the BO procedure independently for RRH1 and RRH2.

The medium is initially busy 732, 734, after which RRH1 and RRH2 detect that the medium is idle, and send a CCA idle status 736, 738 to the CU. The CU receives the idle status from RRH1 and RRH2, and the CU should initiate BOs 740 for backoff slots 742 for RRH1 and backoff slots 744 for RRH2, independently.

The BO for RRH1 is the first to count down to zero, whereby the CU pauses 758 the BO timer for RRH2 and sends it a BO paused message 748, and sends Data and control messages 746 to RRH1 indicating RRH1 should initiate Data transmission. RRH1 receives Data and the control message 746 and should transmit Data 754 in a TXOP 752, under condition that medium is idle 750 for a certain duration. An Ack 756 is received by RRH1 which ends TXOP 752.

The CU then handles BOs 760, by estimating the end of the TXOP on RRH1 side and resumes BO timer 764 for RRH2, and restarts BO timer 762 for RRH1 at the end of the estimated TXOP.

Then the BO 764 for RRH2 first counts down to zero, and the CU pauses 770 the BO timer for RRH1 also sending it a BO paused message 766, and sends a Data and control message 768 to RRH2 indicating RRH2 should initiate Data transmission. RRH2 receives Data and the control message and transmits Data 774 in a TXOP 776, with respect to the medium having been idle for a certain duration 772. An Ack 778 is received by RRH2 in response to its transmission. When the CU sends Data and control message 768 it should estimate the end of TXOP 776 on the RRH2 side and use that estimate in resuming the BO timer 780 for RRH1 and restarting the BO timer 782 for RRH2 at the end of the estimated TXOP.

8. Process Flow Diagrams

8.1. RRH Processing When BO is Processed on RRH Side

Figure 19:
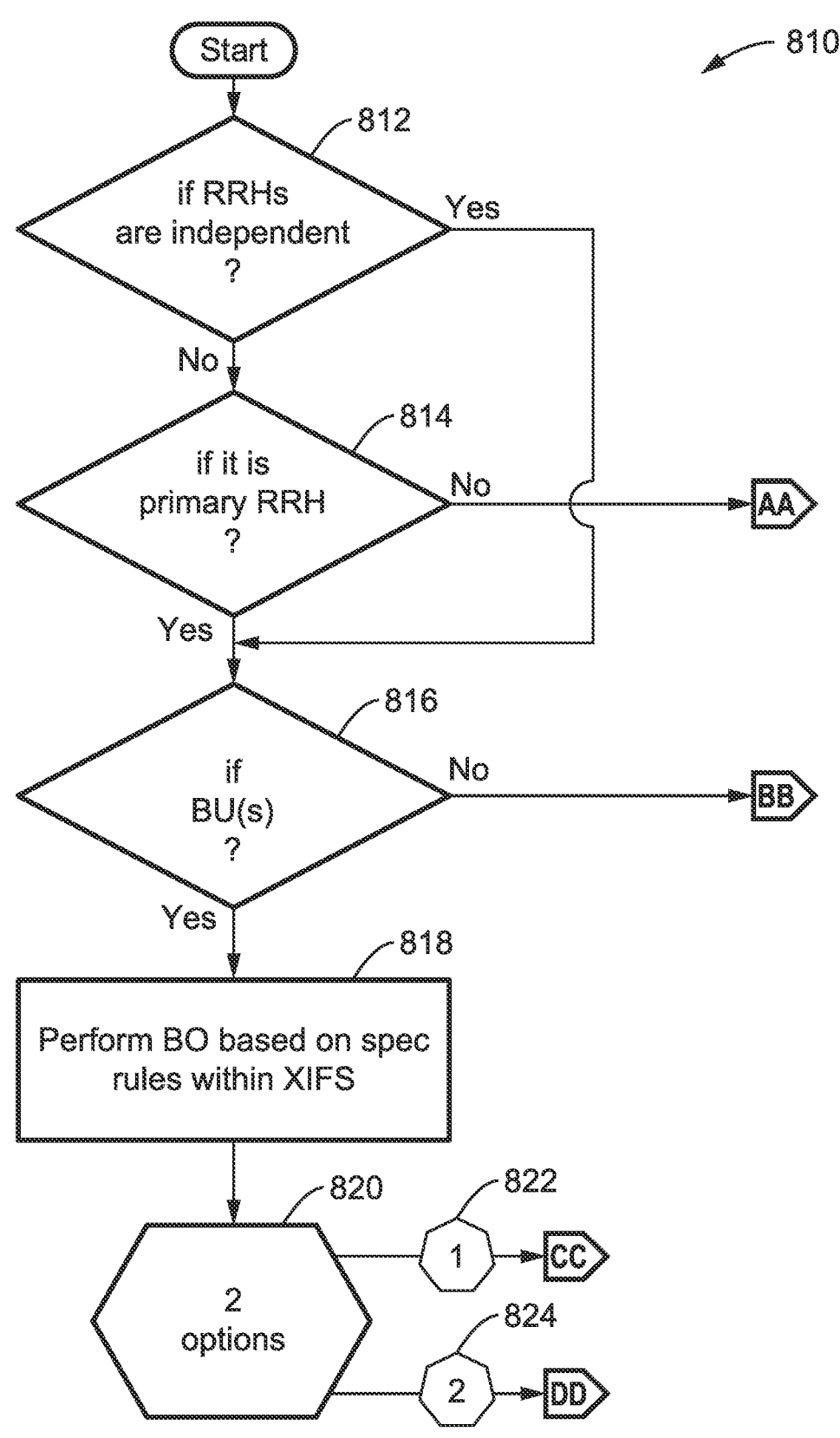
FIG. 19 through FIG. 21 is a flow diagram of RRH processing when the BO is processed on the RRH side, according to at least one embodiment of the present disclosure.
Figure 20:
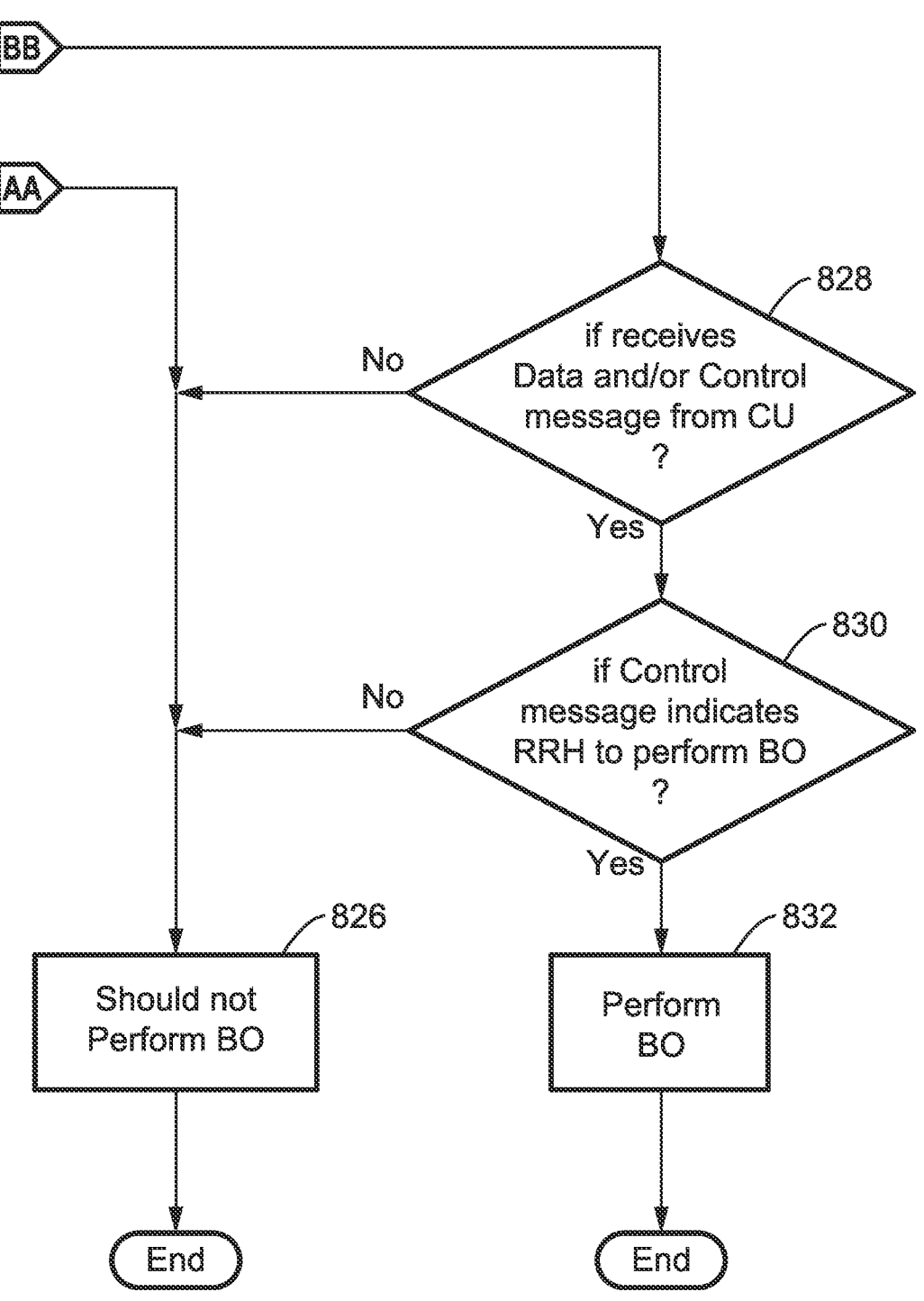
Figure 21:
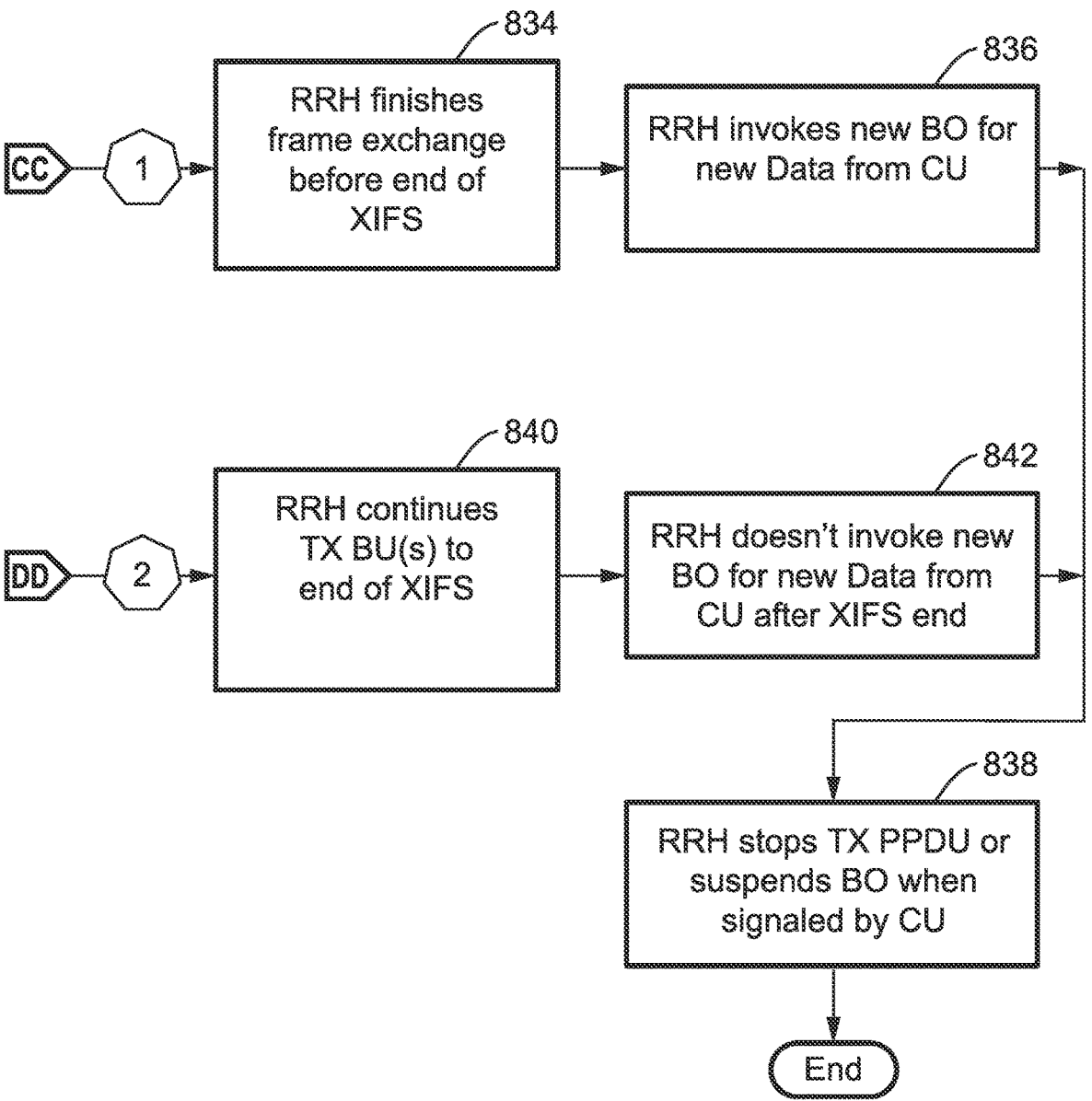

FIG. 19 through FIG. 21 illustrate an example embodiment 810 of RRH processing when the BO is processed on the RRH side.

A first check 812 determines if the RRHs are to be handled independently. If the condition is met, then execution moves to block 816. Otherwise, check 814 determines if this RRH is the primary RRH. If it is not the primary RRH, then execution moves to block 826 in FIG. 20 and the RRH should not perform the BO, and the process is completed. Otherwise, if the condition of check 814 is met then execution reaches block 816.

At block 816 a check is made to determine if the RRH has buffered units (BUs). If there are buffered units, then at block 818, the RRH is to perform a BO based on the specified rules within an XIFS. After this a check 820 determines between a first option 822, and a second option 824.

If the first option 822 is selected, then execution reaches block 834 in FIG. 21 where the RRH finishes a frame exchange before the end of the XIFS interval, and then invokes 836 a new BO for new data from the CU, after which the RRH terminates 838 transmission of the PPDU or suspends BO when signaled by the CU.

If the second option 824 is selected, then execution reaches block 840 in FIG. 21 in which the RRH continues transmitting BU(s) to the end of the XIFS, but does not 842 invoke a new BO for the new Data from the CU after XIFS, execution then reaches block 838 as described above and the process ends.

Returning now to FIG. 19, in the case that check 816 determines that the RRH has no BUs, wherein execution reaches check 828 in FIG. 20, that determines if the RRH has received Data and/or a control message from the CU. If the condition is met, then at check 830, it is determined if the control message indicates that the RRH is to perform a BO. If the condition is met, then at block 832 the RRH performs the BO, and the process ends.

Otherwise, if either condition of check 828 or 830 is not met, then execution reaches block 826, and the RRH does not perform a BO, with the process ending.

8.2. CU Processing When BO is Processed on RRH Side

Figure 22:
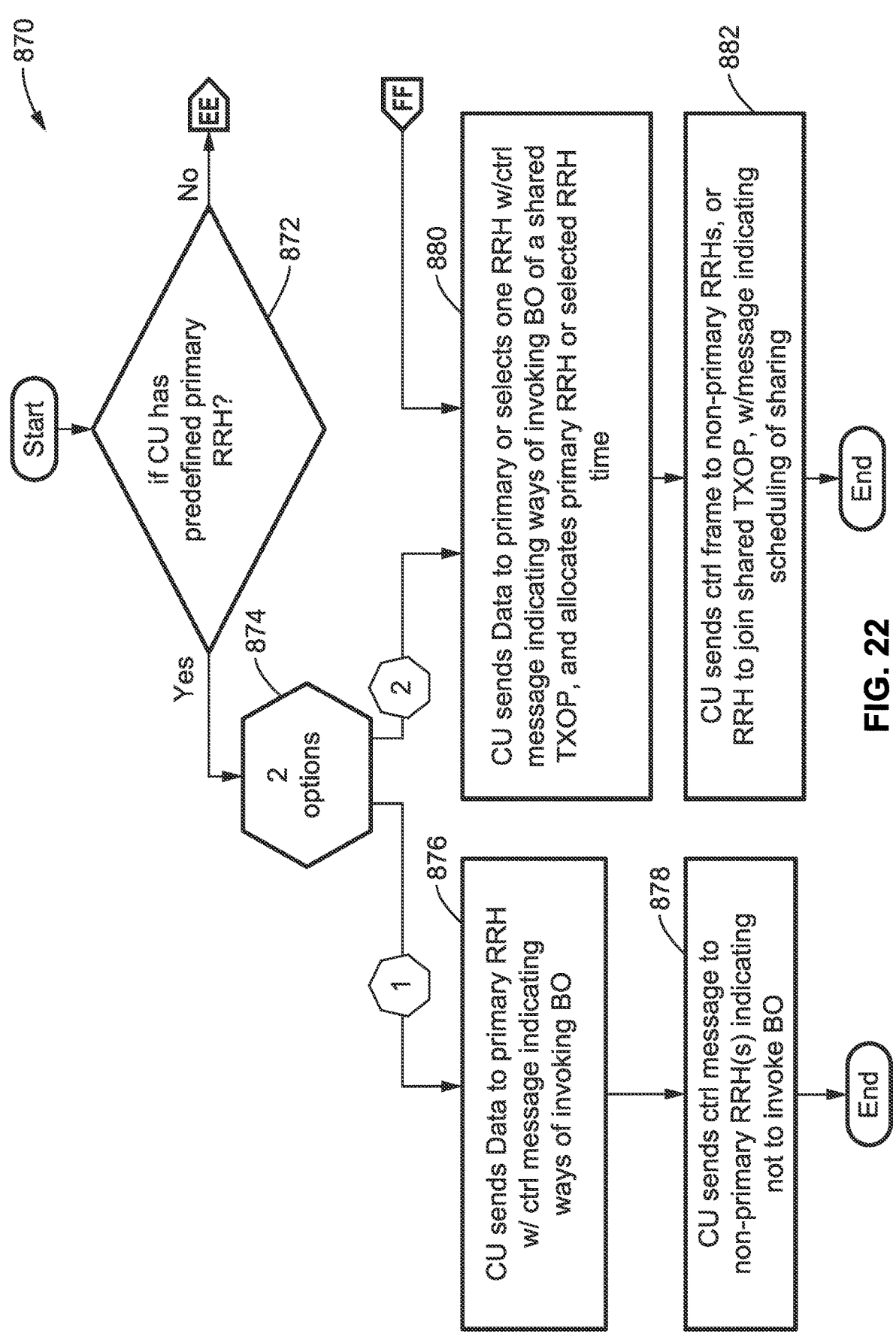
FIG. 22 through FIG. 23 is a flow diagram of processing on the CU side when the BO is processed on the RRH side, according to at least one embodiment of the present disclosure.
Figure 23:
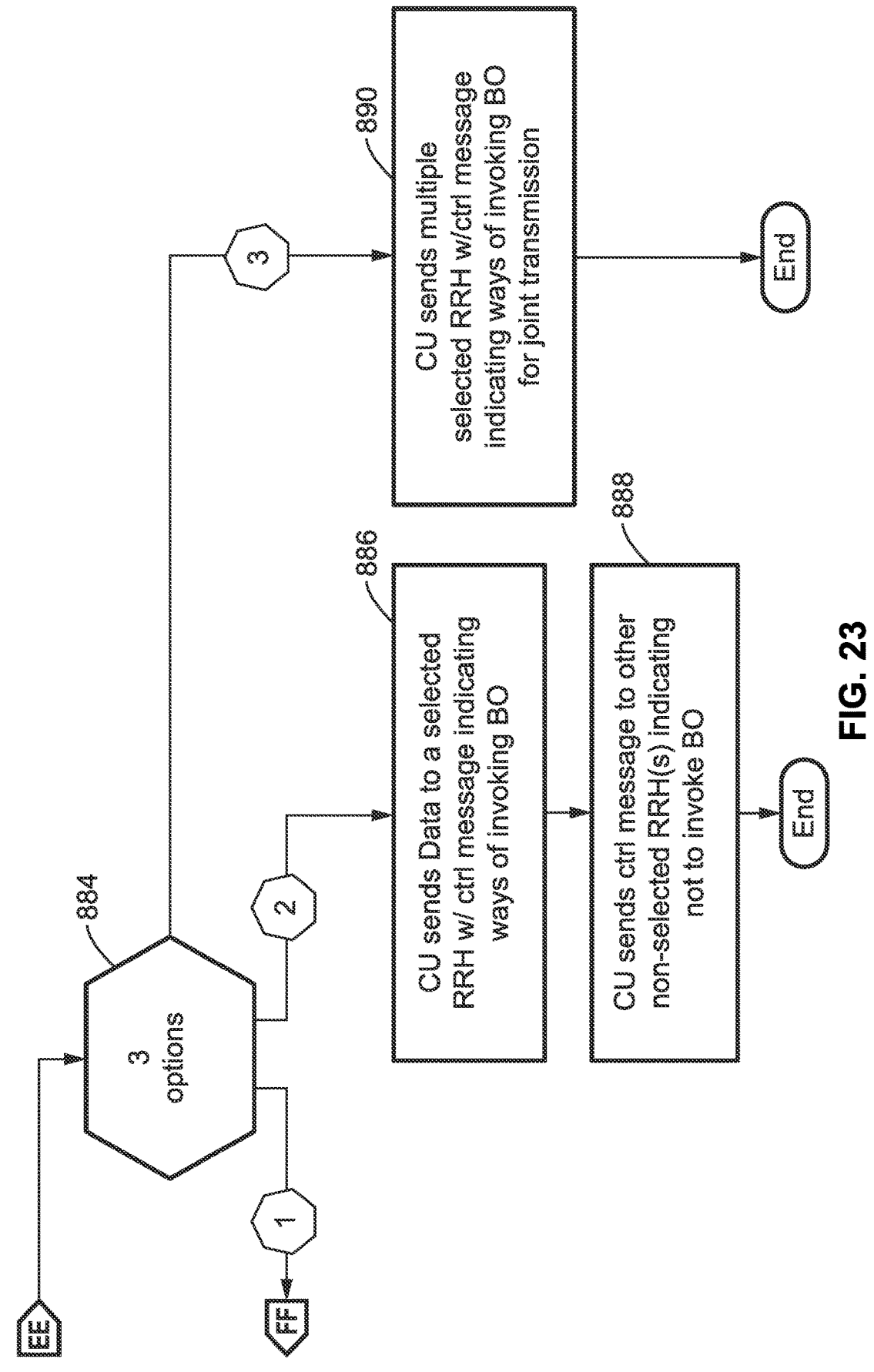

FIG. 22 and FIG. 23 illustrates an example embodiment 870 of processing on the CU side when the BO is processed on the RRH side.

Check 872 determines if the CU has a predefined primary RRH. If the condition is met, then decision block 874 determines between two options.

If a first option is selected then at block 876 the CU sends Data to the primary RRH with a control message indicating the manner in which the RRH is to invoke the BO, then in block 878 the CU can elect to send a control message to the non-primary RRH(s) indicating not to perform a BO, and processing ends.

If the second option of 874 is selected, then at block 880 the CU sends Data to the primary RRH, or selects one RRH with a control message indicating the manner of invoking BO of a shared TXOP, and allocates a primary RRH or selected RRH time. Then in block 882, the CU sends a control frame to the non-primary RRH(s), or indicates that the RRH is to join a shared TXOP, with a message indicating a schedule of TXOP sharing, after which processing ends.

Considering now check 872 in FIG. 22, when the condition is not met, whereby there is not a predefined primary RRH, and execution reaches a three way decision block 884 in FIG. 23. It is determined by the CU in a first decision to handle the situation the same as for the second decision of decision block 874, and thus perform blocks 880 and 882 as previously described.

In a second decision, at block 886 the CU sends Data to a selected RRH with a control message indicating how the RRH is to invoke the BO, then at block 888 the CU, in at least one embodiment/mode/option, sends a control message to other selected RRH(s) indicating that they are not to invoke a BO, after which this processing ends.

In a third decision, at block 890 the CU sends a control message to multiple RRHs, indicating the manner of invoking a BO for joint transmission, after which this processing ends.

8.3. RRH Processing When BO is Processed on the CU Side

Figure 24:
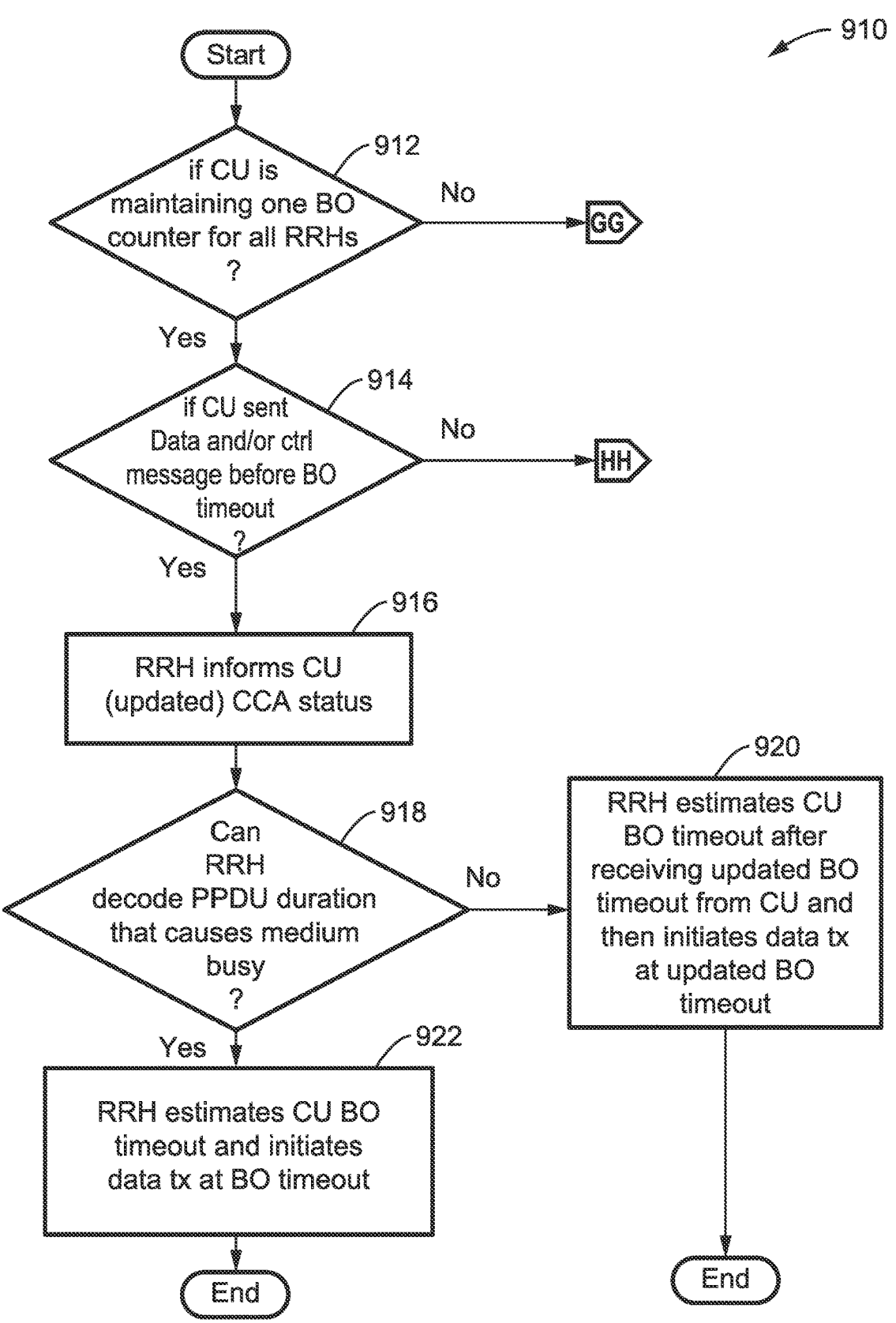
FIG. 24 through FIG. 26 is a flow diagram of RRH side processing when BO is processed on the CU side, according to at least one embodiment of the present disclosure.
Figure 25:
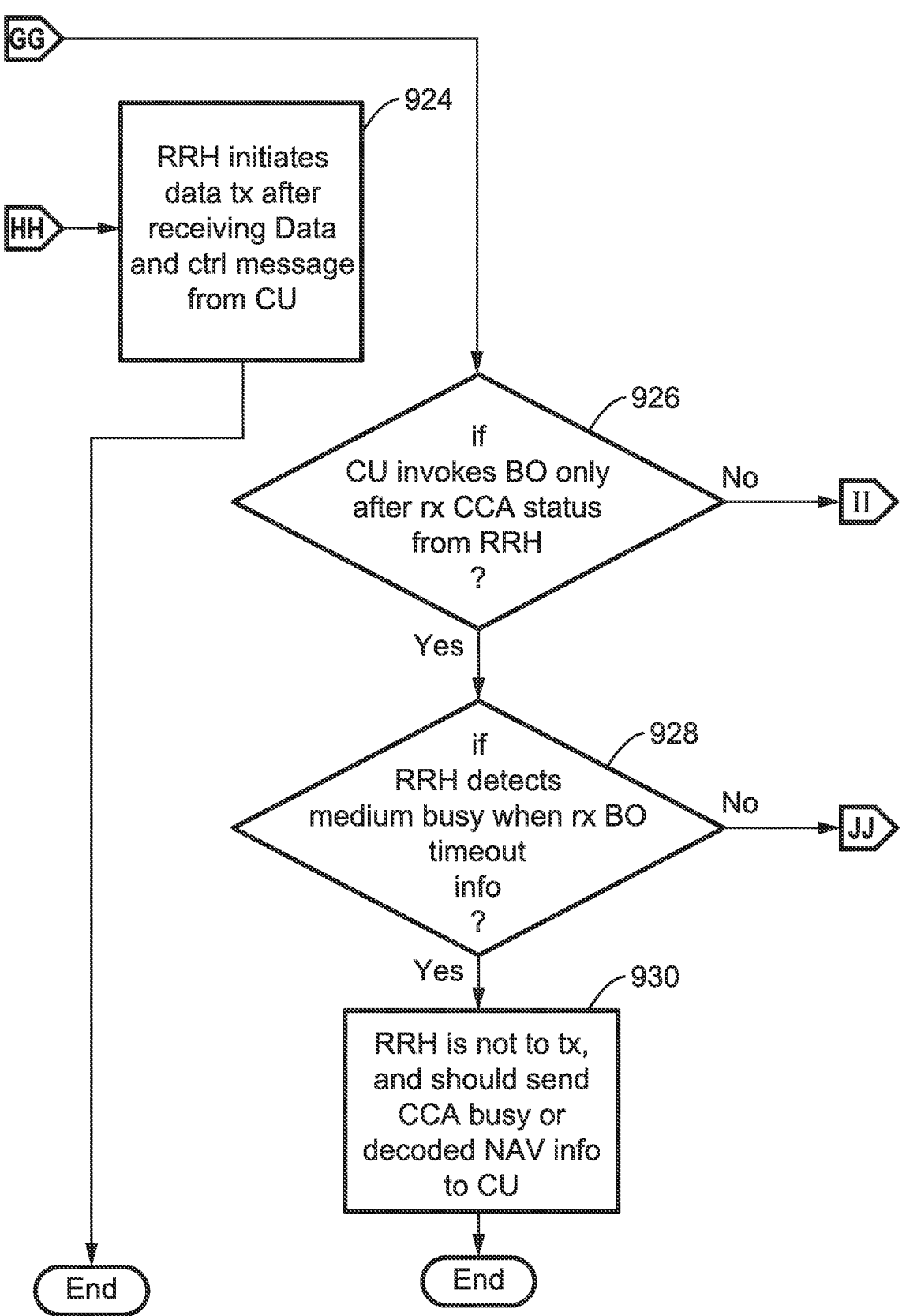
Figure 26:
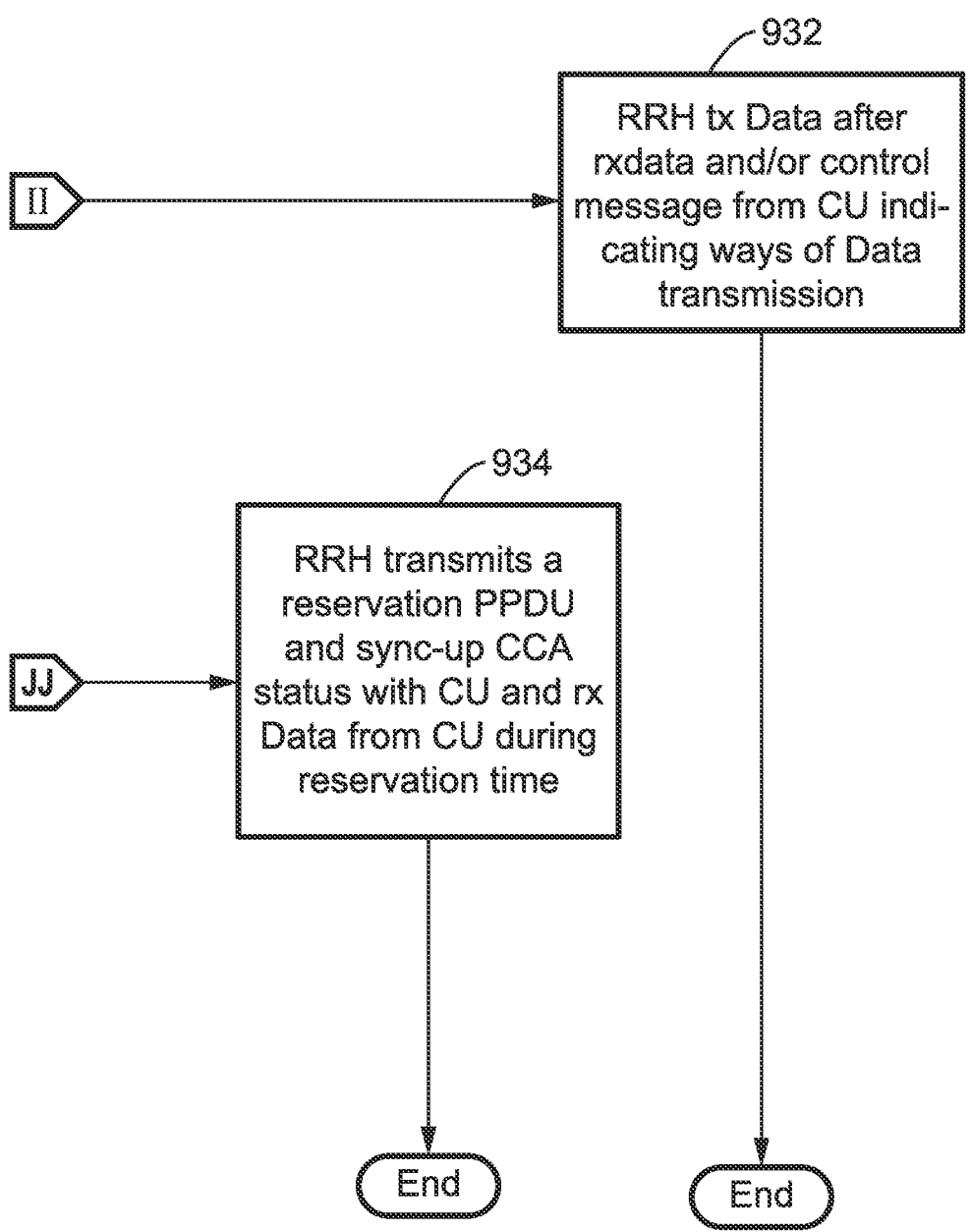

FIG. 24 through FIG. 26 illustrates an example embodiment 910 of RRH side processing when backoffs are processed on the CU side.

In check 912 it is determined if the CU is maintaining one BO counter for all RRHs. If the condition is met, then check 914 determines if the CU sent a Data and/or control message before BO timeout. If the condition is met, then at block 916 the RRH informs the CU with updated CCA status, followed by a check 918 to determine if the RRH can decode the PPDU which caused the medium to become busy. if the condition is met, then at block 922 the RRH estimates a CU BO timeout value and initiates a Data transmission at the expiration of the BO time slots, after which this processing ends.

Otherwise, if the condition of check 918 was not met, then at block 920 the RRH estimates a CU BO timeout after receiving updated BO timeout from the CU and then initiates a Data transmission at the updated BO timeout, after which this processing ends.

Considering now block 912 of FIG. 24, when the condition is not met, whereby execution moves to check 926 of FIG. 25 which determines if the CU has invoked BO only after receiving CCA status from the RRH. If the condition is not met, then execution moves to block 932 in FIG. 26, in which the RRH transmits Data after receiving Data and/or a control message from the CU indicating the way of the data transmission, after which this processing ends.

If the condition of check 926 in FIG. 25 is met, then check 928 determines if the RRH can detect medium busy when it receives BO timeout information. If the condition is not met, then execution reaches check 934 in FIG. 26 and the RRH is to transmit a reservation PPDU and synchronize the CCA status with the CU and receive Data from the CU during the reservation time. Otherwise, if the condition of block 928 in FIG. 25 is met, then the RRH is not to transmit, and should send a CCA busy or decoded NAV information to the CU.

Considering now the case when check 914 in FIG. 25 is not met, whereby block 924 in FIG. 26 is performed in which the RRH initiates a Data transmission after receiving Data and control message from the CU, after which the process is completed.

8.4. CU Processing When BO is Processed on CU Side

Figure 27:
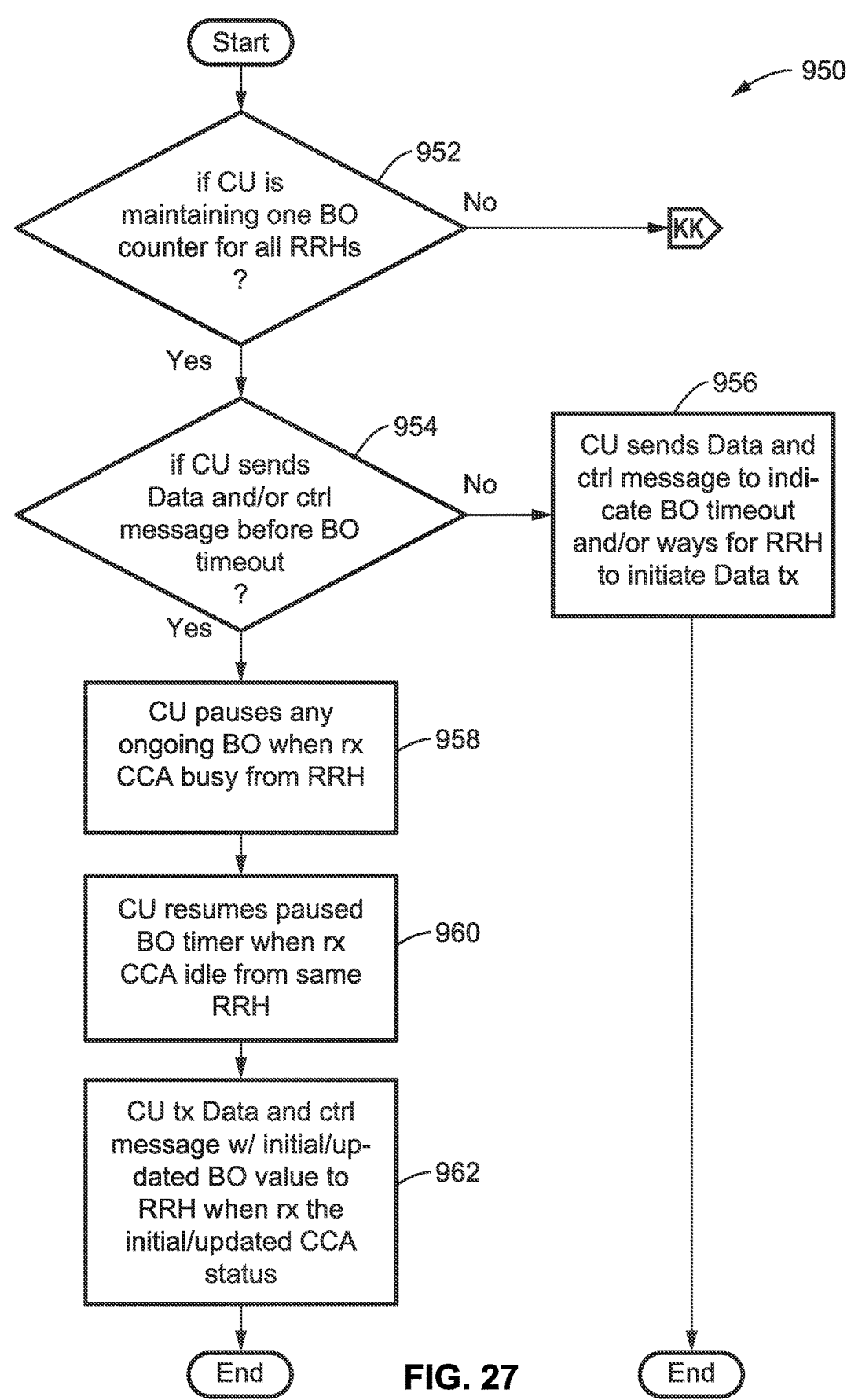
FIG. 27 through FIG. 29 is a flow diagram of CU processing when BO is processed on the CU side, according to at least one embodiment of the present disclosure.
Figure 28:
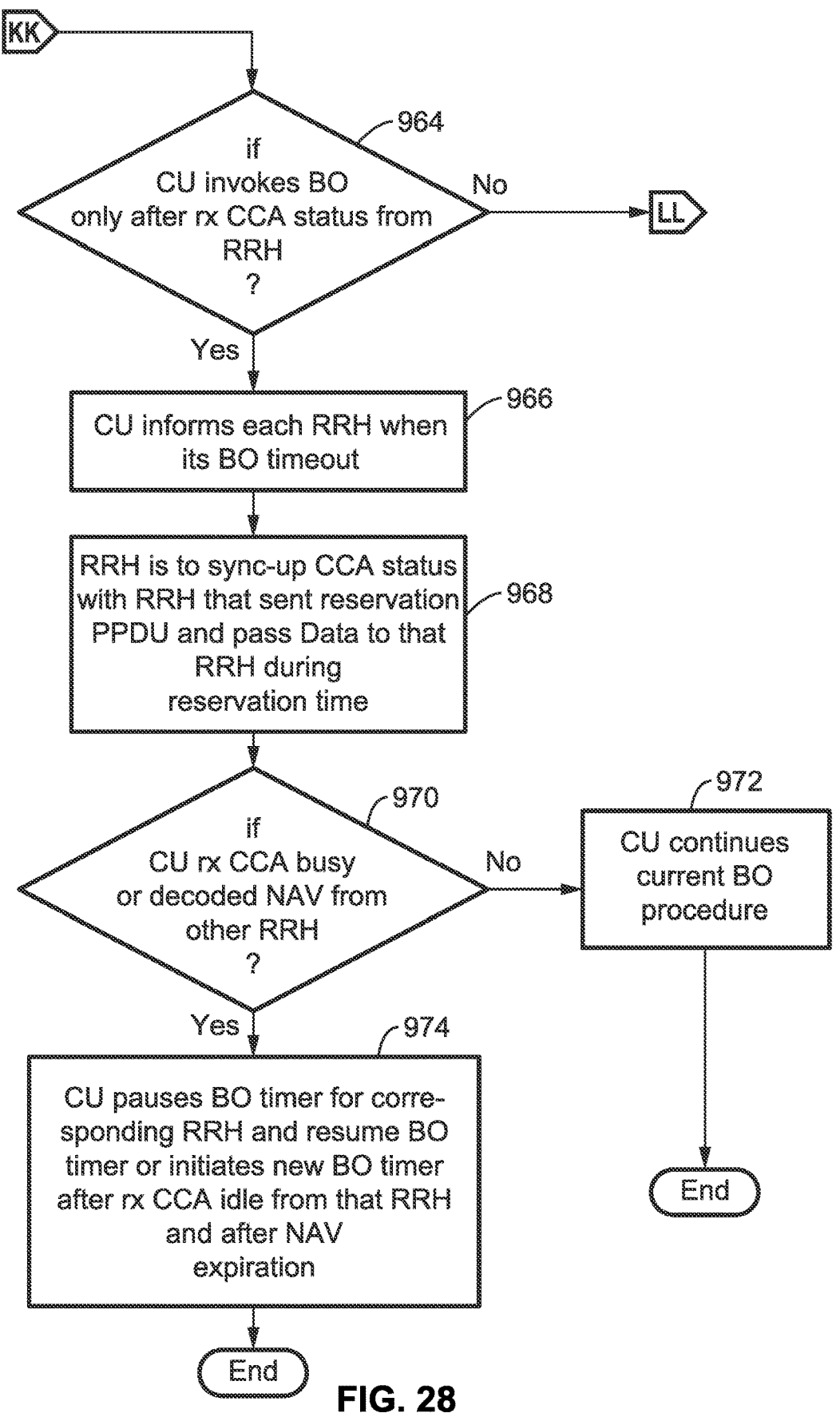
Figure 29:
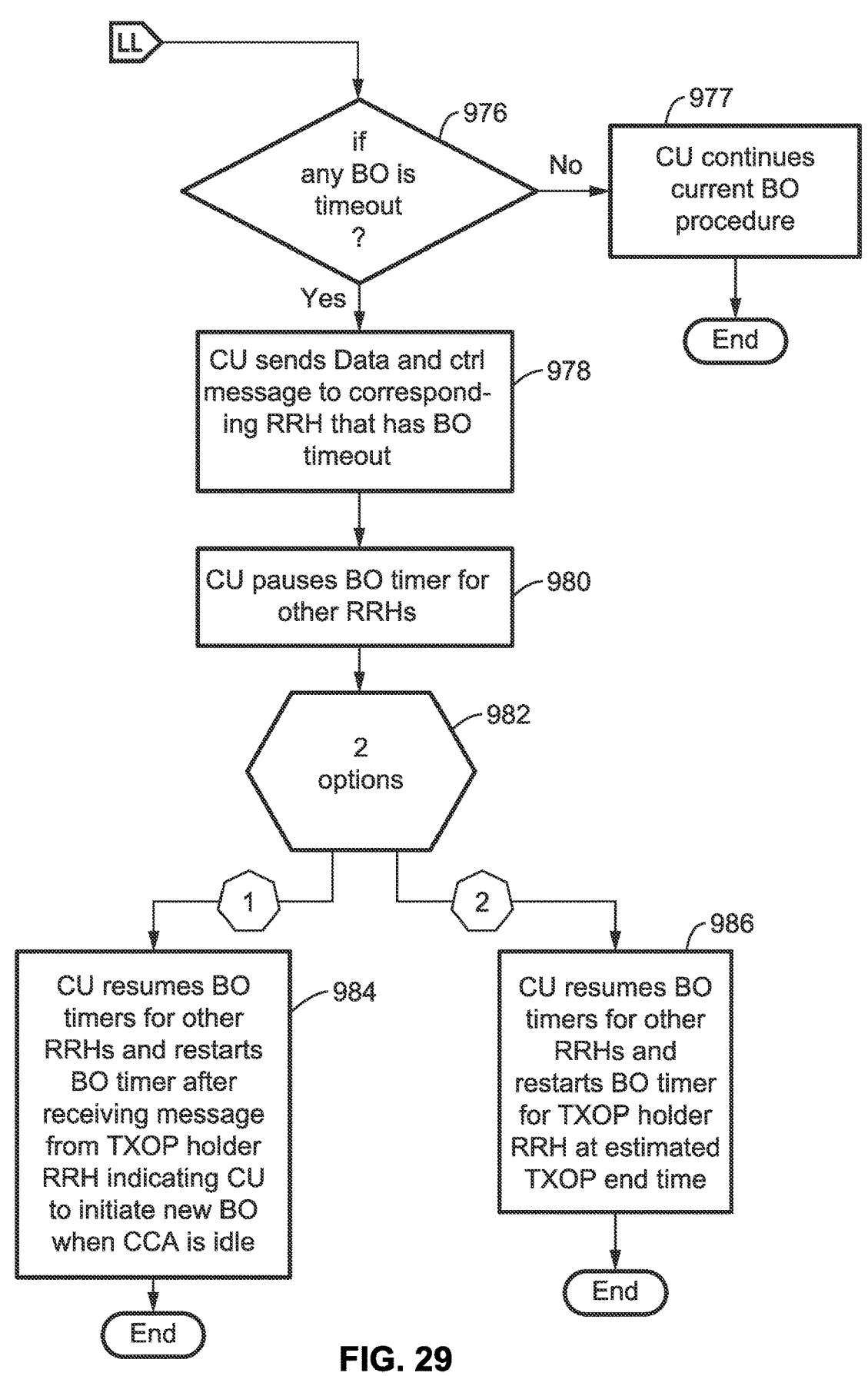

FIG. 27 through FIG. 29 illustrate an example embodiment 950 of CU processing when BO is processed on the CU side.

In check 952 the CU determines if it will be maintaining a single BO counter for all the RRHs. If the condition is met, then check 954 determines if the CU is to send Data and/or a control message before the BO timeout. If the condition is not met, then at block 956, the CU sends Data and control message to indicate BO timeout and/or indicates another manner in which the RRH is to initiate a Data transmission.

Otherwise, if the condition of check 954 is met, then at block 958 the CU pauses an ongoing BO(s) when it receives CCA busy from an RRH. Then at block 960 the CU resumes paused BO timer when it receives CCA idle from the same RRH. The CU then at block 962 transmits Data and control message including an initial or updated BO value to the RRH after receiving an initial or updated CCA status from the RRH.

Considering now the case of check 952, when the condition is not met execution reaches check 964 of FIG. 28. The CU determines if it should invoke BO only after receiving CCA status from an RRH.

If the condition is met, then at block 966 the CU informs each RRH of its BO timeout value. At block 968 the RRH synchronizes with the CCA status with the RRH that sent the reservation PPDU, and passes Data to that RRH during the reservation time period.

At check 970 the CU determines if it has received a CCA busy or decoded a NAV from the other RRH. If the condition is not met, then at block 972 the CU continues the current BO procedure. Otherwise, at block 974 the CU pauses the BO timer for the corresponding RRH and resumes the BO timer after receiving a CCA idle from that RRH and after NAV expiration.

Considering now the case of check 964 of FIG. 28 when the condition is not met, whereby execution reaches check 976 of FIG. 29 in which the CU determines if any BO has timed out (expired). If the condition is not met, then at block 977 the CU continues the current BO procedure. Otherwise, at block 978 the CU sends Data and a control message to the corresponding RRH which had the BO timeout. Then at block 980, the CU pauses the BO time for other RRHs. The CU then makes a decision 982 between two options.

If the first decision is selected, then at block 984 the CU resumes BO timers for other RRHs and restarts the BO timer after receiving a message from the TXOP holder RRH indicating that the CU should initiate a new BO when the CCA is idle.

Otherwise, if the second decision is selected, then at block 986 the CU resumes BO timers for other RRHs and restarts the BO timer for the TXOP holder RRH at the estimated TXOP end time.

9. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A remote radio head station apparatus for communication in a wireless network, the apparatus comprising: (a) at least one modem coupled to at least one radio-frequency (RF) circuit, with each RF circuit connected to one or multiple antennas; (b) wherein said station (STA) is a separate STA, or as a STA within a multiple-link device (MLD), and configured as a Remote Radio Head (RRH) which is controlled by a Central Unit, located at a different geographic location, over a wired backhaul link that is configured for connecting to multiple RRH, including said RRH, which may not be sufficiently spatially deviated to prevent interference between different RRH; (c) a processor of said STA; (d) a non-transitory memory storing instructions executable by the processor for wirelessly communicating with other STAs on a IEEE 802.11 wireless local area network (WLAN); and (e) wherein said instructions, when executed by the processor, perform steps of a wireless communications protocol, comprising: (e)(i) wherein said RRH operates in the wireless communications protocol using a carrier sense multiple access (CSMA) mechanism; (e)(ii) wherein said RRH performs clear channel assessment (CCA) on the medium to determine if the medium is busy or idle, and obtains the medium, comprising: (e)(ii)(A) wherein the RRH broadcasts a physical layer protocol data unit (PPDU), as either: a reservation PPDU, or a PPDU to quiet the channel through using a network allocation vector (NAV), or using a quiet element spanning a certain time frame; (e)(ii) (B) wherein the broadcasted PPDU for obtaining the medium is transmitted after detecting that the medium is idle for a certain IFS time period, and without the need of a backoff (BO) procedure; and (e)(ii)(C) wherein the RRH occupies the medium during the reserved duration and in synchronization with the CCA status and the BO status with its CU; and (e)(ii)(D) wherein the RRH: (i) having buffered units (BUs) with valid lifetimes, performs a BO procedure after a certain medium idle time has elapsed and then transmits its Data frame; (ii) having zero BUs performs a BO procedure after a certain medium idle time before the end of an extended interframe space (XIFS) interval, with said XIFS interval commencing when the RRH transmits a CCA idle status to the CU with the XIFS interval ending when the RRH receives Data from the CU, after which upon BO completion the RRH transmits Data which was previously received from the CU.

A remote radio head station apparatus for communication in a wireless network, the apparatus comprising: (a) a central unit (CU) of said apparatus which is configured for communicating over backhaul links to control multiple stations, located at a different geographic location, operating as remote radio heads (RRHs) which each have at least one modem coupled to at least one radio-frequency (RF) circuit, with each RF circuit connected to one or multiple antennas; (b) a processor of said CU; (c) a non-transitory memory storing instructions executable by the processor for communicating over the backhaul link with multiple RRHs; and (d) wherein said instructions, when executed by the processor, perform steps in controlling the RRHs in performing a wireless communications protocol in under IEEE 802.11, comprising: (d)(i) wherein said CU controls the multiple RRHs in performing the wireless communications protocol using a carrier sense multiple access (CSMA) mechanism; (d)(ii) wherein the CU is maintaining a single BO counter for all the RRHs: (d)(ii)(A) wherein if the BO timeout arises before the CU has sent a Data and/or control message to the RRH, whereby the CU sends a Data and control message to the RRH to indicate BO timeout, and/or otherwise indicates the manner in which the RRH is to initiate Data transmission; (d)(ii)(B) wherein if the BO timeout arises after the CU has sent Data and/or control message to the RRH, the CU pauses ongoing BOs when it receives a CCA busy from an RRH, then resumes paused BO timer when it receives CCA idle from the same RRH, after which the CU transmits a Data and control message, including an initial or updated BO value to the RRH after receiving an initial or updated CCA status from the RRH; (d)(iii) wherein the CU is maintaining separate BO counters for the RRHs: (d)(iii)(A) wherein the CU determines to invoke a BO only after receiving CCA status from an RRH, and the CU informs each RRH of its BO timeout value which allows the RRH to synchronize CCA status with an RRH that has sent a reservation PPDU, and for the RRH to pass data to that RRH during reservation time; (d)(iii)(A)(a) wherein if the CU has received a CCA busy, or decoded a NAV, from the other RRH, then the CU pauses the BO timer for the corresponding RRH and resumes the BO timer after receiving a CCA idle from that RRH and after NAV expiration; (d)(iii)(A)(b) wherein if the CU has not received a CCA busy, or decoded a NAV, from the other RRH, then the CU continues the current BO procedure; and (d)(iii)(B) wherein the CU determines not to wait for invoking a BO only after receiving CCA status from an RRH, comprising: (d)(iii)(B)(a) wherein there is not a BO time out the CU continues with a current BO procedure for that RRH; (d)(iii)(B)(b) wherein if there is any BO timeout then the CU sends Data and a control message to the corresponding RRH which had the BO timeout, and pauses the BO timer for other RRHs; wherein the CU determined to either: (d)(iii)(B)(b)(1) resume BO timers for other RRHs and restart the BO timer after receiving a message from the TXOP holder RRH indicating that the CU should initiate a new BO when the CCA is idle; or (d)(iii)(B)(b)(2) resume BO timers for other RRHs and restart the BO timer for the TXOP holder RRH at the estimated TXOP end time.

A method of performing communication in a wireless network using remote radio heads (RRHs), comprising: (a) configuring each station (STA) on a wireless IEEE 802.11 network as either a separate STA, or as a STA within a multiple-link device (MLD), and each STA is configured as a Remote Radio Head (RRH) which is controlled by a central unit (CU), located at a different geographic location, over a wired backhaul link that is configured for connecting to multiple RRHs, which may not be sufficiently spatially deviated to prevent interference between different RRHs; (b) wherein each RRH is operating in the wireless communications protocol using a carrier sense multiple access (CSMA) mechanism; (c) performing clear channel assessment (CCA) on the medium by each RRH to determine if the medium is busy or idle, prior to obtaining the medium for performing a communication, comprising: (c)(i) broadcasting a physical layer protocol data unit (PPDU) by the RRH, as either: a reservation PPDU, or a PPDU to quiet the channel through using a network allocation vector (NAV), or using a quiet element spanning a certain time frame; (c)(ii) wherein the broadcasted PPDU for obtaining the medium is transmitted after detecting that the medium is idle for a certain IFS time period, and without the need of a backoff (BO) procedure; and (c)(iii) occupying the medium during the reserved duration by the RRH and in synchronization with the CCA status and the BO status with its CU; and (c)(iv) performing by the RRH based on status of buffered units: (c)(iv)(A) having buffered units (BUs) with valid lifetimes, performs a BO procedure after a certain medium idle time has elapsed and then transmits its Data frame; (c)(iv)(B) having zero BUs performs a BO procedure after a certain medium idle time before the end of an extended interframe space (XIFS) interval, with said XIFS interval commencing when the RRH transmits a CCA idle status to the CU with the XIFS interval ending when the RRH receives Data from the CU, after which upon BO completion the RRH transmits Data which was previously received from the CU.

An RRH apparatus in which a CU has multiple distributed RRH connecting to it, some RRHs associated with the same CU are not spatially deviated of their communication coverage area, thus they can interfere with each other.

An RRH apparatus in which the CCA is implemented at the RRH side (Example 5-1, 5-2): (a) RRHs may broadcast a reservation PPDU (e.g., Null frame) or a PPDU to quiet the channel through NAV or quiet elements for a certain time; (b) RRHs could send the broadcasted PPDU for channel reservation after detecting the medium idle for a certain IFS time period and without BO procedure; and (c) RRHs occupy the channel during the reserved duration synchronization with the CCA status and the BO status with CU.

An RRH apparatus in which Backoff (BO) procedure is performed on the RRH side, comprising: (a) CU may have one pre-determined primary RRH that performs (runs) a BO procedure, the other RRHs connected with the same CU are non-primary RRHs and do not run BO, and thus, should not initiate transmissions without receiving a signal from the CU. (Example 7-1); (a)(i) the determination of the primary RRH is application dependent and is not in the scope of this disclosure; (a)(ii) CU may have one fixed pre-determined primary RRH or CU may select the primary RRH during processing the CCA status and only send Data to the primary RRH; (b) wherein CU may not have any pre-determined primary RRH; wherein the RRHs connect with the same CU should run BO procedure independently; (c) wherein pre-determined primary RRH; (c)(i) with Buffered Units (BU)s that have valid lifetimes should invoke a BO procedure after a certain medium idle time based on specification rules; (d) the pre-determined primary RRH: with zero BU could invoke BO procedure if the RRH sends the CCA idle status to the CU; (d)(i) wherein after the BO, the RRH may transmit a null frame to reserve channel access or send a frame carrying the quiet information to reserve/quiet a channel until the Data frame from the CU are received by this RRH (Example 7-1); (e) wherein the RRH with zero BU should invoke BO procedure after the RRH detects a certain medium idle time before the end of the new IFS time; otherwise, the RRH should not invoke the BO procedure (Example 7-2); (e)(i) wherein the new IFS time, denoted as XIFS in this disclosure, starts when the RRH sends CCA idle status to CU and finishes when the RRH receives the Data from CU; wherein a XIFS time=a DIFS time+aRRH-CURoundTripTimeDelay, where aRRHCURoundTripTime-Delay is the round-trip delay between RRH and CU; (f) the RRH with zero BU should NOT invoke BO procedure if it receives a control signal from the CU indicating it shall not run BO procedure; (g) the RRH with Buffered Units (BU)s with valid lifetime should run BO procedure after a certain medium idle time based on spec rule. (Example 7-3); (h) wherein the RRH that sent the CCA idle status to the CU, and then invokes the BO should: (h)(i) wherein the RRH either finishes the frame exchanges before the end of the XIFS time; wherein the RRH should initiate a new BO procedure (Example 7-3); (h)(ii) or process the frame exchange during of the XIFS time if not violate the TXOP limitation rule and: (h)(ii) (A) should not surpass the end of the XIFS time even if not violate the TXOP limitation; (h)(ii)(A)(b) should continue transmitting new Data frames from the CU without invoking a new BO if it receives a Data frame from CU at the end of the XIFS time (Example 7-4); (h)(ii)(A)(c) should stop transmission or suspend BO counting if it receives control signaling from CU indicating it should not access the channel after receiving that signal (Example 7-5); (j) wherein the pre-determined primary RRH with zero BU or the RRH with zero BU should perform BO procedure after receiving DATA and control signaling from the CU that indicates a TXOP sharing schedule, and should share the TXOP with other RRHs in one TXOP; wherein the RRHs that have been shared in a TXOP by TXOP holder doesn't need to run BO procedure during the shared TXOP (Example 7-6).

An apparatus in which a Backoff (BO) procedure is performed on the CU side, comprising: (a) wherein a CU may run one backoff counter for all connected RRHs or maintain independent backoff counter for each of the connected RRHs; (b) wherein when a CU runs one backoff counter for all connected RRHs, then the CU can send Data and/or control signal to the RRH before or after the backoff counts down to zero; (b)(i) wherein if the CU sends Data and/or control signals to the RRH before starting BO procedure, then the CU should pause the BO procedure when receiving CCA busy status from the RRH, and then resume the BO procedure when receiving CCA idle status from RRH; wherein the CU should indicate the initiated or resumed BO value in the control signal for RRHs to estimate the initial or updated BO expiration time (Example 7-7);

(b)(ii) wherein if the RRH receives Data and control message from CU indicating the initial BO value, it should estimate the BO expiration time; (b)(ii)(A) wherein if the RRH detects busy medium within the XIFS time without receiving any control message from the CU indicating the initial or updated BO value, the RRH should immediately send the CCA busy status to the CU and CCA idle status to CU after detecting the busy medium finished (Example 7-7); (b)(ii)(B) wherein if the RRH didn't detect busy medium within the duration since it sent CCA idle to CU until the BO timeout as indicated in the received initial/updated BO value, the RRH should start Data transmission after the initial/updated BO timeout (Example 7-7); (b)(ii)(C) wherein if the RRH detects busy medium within the duration since it sent CCA idle to CU till the initial BO timeout as indicated in the received initial BO value, the RRH should add any decoded interfering PPDU duration to the initial BO expiration time if it could decode the duration of the PPDU and should start Data transmission after the updated BO timeout; wherein the updated BO value will be considered as the new initial BO value; otherwise, if RRH could not decode the duration of the interfering PPDU, it should wait until receiving an updated control message from CU indicating the updated BO value and should start Data transmission after the updated BO timeout (Example 7-7); (b)(ii)(D) wherein if the RRH detects busy medium after the initial/updated BO timeout as indicated in the received initial/updated BO value, RRH may not send the updated CCA status to CU since it is already out of date; (b)(ii)(E) wherein the RRH should be aware of the round-trip time between CU and itself; (b)(iii) wherein if the CU sends Data and/or control signals to RRH after BO procedure, the CU may indicate the BO timeout (BO value equals zero) in the control signal; and wherein the CU may send control message to RRH indicating if the RRH should start Data transmission if it has detected medium idle for a certain amount of time (Example 7-8); (b)(iv) wherein the CU may also indicate how long should the RRH keep detecting the state of the medium if it hasn't detected medium idle for that certain time after receiving the control message from the CU (no example); (b)(v) wherein the RRH should initiate transmission of the Data if it receives Data and control message indicating it should start Data transmission if it has detected medium idle for a certain time (Example 7-8); (b)(vi) wherein the RRH may keep detecting the state of the medium for a duration as indicated in the control message and start Data transmission when it detected medium idle for the indicated time (no example); (c) wherein when the CU maintains independent BO counter for each connected RRHs, CU could invoke the BO procedures before receiving CCA status from RRHs. CU should inform each RRH its BO timeout (Example 7-9); (c)(i) wherein if RRH has detected medium idle for certain time at the BO timeout, it should send a reservation PPDU to reserve the medium; (c)(ii) wherein during the reservation PPDU duration, CU and RRH should finish synchronizing (synch-up) of CCA status and pass Data and/or control signal from CU to RRH; wherein the RRH should transmit the Data in the TXOP reserved by the reservation PPDU; (c)(iii) wherein if RRH detects CCA busy or decodes an NAV reservation duration from a received PPDU that is not addressed to it, it should not access channel and should send CCA busy and/or NAV info to CU; (c)(iv) wherein the CU which receives the CCA busy and/or NAV reservation from RRH should pause the BO counter for that RRH and should update the BO timeout to that RRH through a new control message if the BO counter is running; wherein otherwise, CU should restart a new BO counter for that RRH after the reserved duration; (d) wherein the CU maintains independent BO counters for each connected RRHs, and the CU invokes the BO procedure of each RRH after receiving the CCA status detected by each RRH and inform the BO timeout to the RRH: (d)(i) wherein the CU should pause the BO timer for other RRH(s) if one BO timer counts down to zero; wherein the CU should send Data and control message indicating the BO timeout to the corresponding RRH, allowing RRH to initiate Data transmission (Example 7-10); (d)(ii) wherein the CU may resume BO timers for other RRHs and restart the BO timer after receiving the message from the RRH that finished transmission/reception and detects CCA idle for a certain duration (Example 7-10); and (d)(iii) wherein the CU may resume BO timers for other RRHs and restart the BO timer at the estimated TXOP end time without the need to receive a message from the RRH that finished transmission/reception and detects CCA idle for certain duration (Example 7-11).

An apparatus in which the RRH may report the NAV value to CU if it can resolve the NAV information, comprising: (a) wherein the RRH may not forward the received PPDU to CU if it understands the frame is not addressed to it or to the CU; (b) wherein if the RRH cannot resolve the NAV information, it needs to forward the received frame to CU anytime it receives a new frame; wherein the CU will resolve the NAV value and should send this information back to RRH.

The apparatus or method of any preceding implementation, wherein said XIFS is a new IFS time having a duration of a distributed coordination function (DCF) interframe Spacing (DIFS) time and a round-trip delay between RRH and its associated CU.

The apparatus or method of any preceding implementation, wherein if the CU has designated a primary RRH, then that primary RRH is the RRH which obtains the medium, while non-primary RRHs which are connected with the same CU do not perform a BO, and do not initiate transmission without receiving a signal from the CU indicating to do so.

The apparatus or method of any preceding implementation, wherein the RRH which sent the CCA idle status to the CU and then performed the BO, either: (a) completes frame exchanges before the end of the XIFS time, with the RRH initiating a new BO procedure; or (b) the RRH processes the frame exchange during the XIFS time, which must also not violate the transmission opportunity (TXOP) limitation and continues transmitting new Data frames received from the CU without invoking a new BO if the Data frame from the CU is received at the end of the XIFS time; and wherein the RRH ends its transmission, or suspends BO counting, upon receiving control signaling from the CU, indicating it should not access the channel after receiving that signal.

The apparatus or method of any preceding implementation, wherein the RRH receiving Data and control signaling from the CU, also receives in the control signaling an indication to share the TXOP with other RRHs in one TXOP.

The apparatus or method of any preceding implementation, wherein an RRH receiving permission to share a TXOP is not required to perform a BO procedure during the shared TXOP.

The apparatus or method of any preceding implementation, wherein if the RRH receives a Data and/or control message from the CU indicating the initial BO value, it should estimate the BO expiration time.

The apparatus or method of any preceding implementation, wherein if the RRH detects that the medium is busy after receiving an initial, or updated, BO timeout from the CU, then it is not to send the updated CCA status to CU since it is already out of date.

The apparatus or method of any preceding implementation, wherein each RRH maintains information about the round-trip time, over the backhaul link, between itself and the CU.

The apparatus or method of any preceding implementation, wherein the CU can indicate in its control messages to an RRH, how long the RRH should continue detecting the status of the medium if it has not detected that the medium is idle, after receiving the control message from CU.

The apparatus or method of any preceding implementation, wherein the CU is configured to receive reported NAV values from an RRH when that RRH can resolve the NAV information; and to receive a frame forwarded from that RRH if that RRH is unable to resolve the NAV information.

The apparatus or method of any preceding implementation, wherein the CU directs an RRH not to forward a received PPDU to the CU, unless the frame is addressed to the RRH or to the CU.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A remote radio head station apparatus for communication in a wireless network, the apparatus comprising: (a) at least one modem coupled to at least one radio-frequency (RF) circuit, with each RF circuit connected to one or multiple antennas; (b) wherein said station (STA) is a separate STA, or as a STA within a multiple-link device (MLD), and configured as a Remote Radio Head (RRH) which is controlled by a Central Unit, located at a different geographic location, over a wired backhaul link that is configured for connecting to multiple RRH, including said RRH, which may not be sufficiently spatially deviated to prevent interference between different RRH; (c) a processor of said STA; (d) a non-transitory medium storing instructions executable by the processor for wirelessly communicating with other STAs on a IEEE 802.11 wireless local area network (WLAN); and (e) wherein said instructions, when executed by the processor, perform steps of a wireless communications protocol, comprising: (i) wherein said RRH operates in the wireless communications protocol using a carrier sense multiple access (CSMA) mechanism; (ii) wherein said RRH performs clear channel assessment (CCA) on the medium to determine if the medium is busy or idle, and obtains the medium, comprising: (A) wherein the RRH broadcasts a physical layer protocol data unit (PPDU), as either: a reservation PPDU, or a PPDU to quiet the channel through using a network allocation vector (NAV), or using a quiet element spanning a certain time frame; (B) wherein the broadcasted PPDU for obtaining the medium is transmitted after detecting that the medium is idle for a certain IFS time period, and without the need of a backoff (BO) procedure; and (C) wherein the RRH occupies the medium during the reserved duration and in synchronization with the CCA status and the BO status with its CU; and (D) wherein the RRH: (i) having buffered units (BUs) with valid lifetimes, performs a BO procedure after a certain medium idle time has elapsed and then transmits its Data frame; (ii) having zero BUs performs a BO procedure after a certain medium idle time before the end of an extended interframe space (XIFS) interval, with said XIFS interval commencing when the RRH transmits a CCA idle status to the CU with the XIFS interval ending when the RRH receives Data from the CU, after which upon BO completion the RRH transmits Data which was previously received from the CU.

2. The apparatus of claim 1, wherein said XIFS is a new IFS time having a duration of a distributed coordination function (DCF) interframe Spacing (DIFS) time and a round-trip delay between RRH and its associated CU.

3. The apparatus of claim 1, wherein if the CU has designated a primary RRH, then that primary RRH is the RRH which obtains the medium, while non-primary RRHs connected with the same CU do not perform a BO, and do not initiate transmission without receiving a signal from the CU indicating to do so.

4. The apparatus of claim 1:

wherein the RRH which sent the CCA idle status to the CU and then performed the BO, either: (a) completes frame exchanges before the end of the XIFS time, with the RRH initiating a new BO procedure; or (b) the RRH processes the frame exchange during the XIFS time, which must also not violate the transmission opportunity (TXOP) limitation and continues transmitting new Data frames received from the CU without invoking a new BO if the Data frame from the CU is received at the end of the XIFS time; and wherein the RRH ends its transmission, or suspend BO counting, upon receiving control signaling from the CU indicating it should not access the channel after receiving that signal.

5. The apparatus of claim 1, wherein the RRH receiving Data and control signaling from the CU, also receives in the control signaling an indication to share the TXOP with other RRHs in one TXOP.

6. The apparatus of claim 1, wherein an RRH receiving permission to share a TXOP is not required to perform a BO procedure during the shared TXOP.

7. A remote radio head station apparatus for communication in a wireless network, the apparatus comprising:

(a) a central unit (CU) of said apparatus which is configured for communicating over backhaul links to control multiple stations, located at a different geographic location, operating as remote radio heads (RRHs) which each have at least one modem coupled to at least one radio-frequency (RF) circuit, with each RF circuit connected to one or multiple antennas;

(b) a processor of said CU;

(c) a non-transitory memory storing instructions executable by the processor for communicating over the backhaul link with multiple RRHs; and (d) wherein said instructions, when executed by the processor, perform steps in controlling the RRHs in performing a wireless communications protocol in under IEEE 802.11, comprising:

(i) wherein said CU controls the multiple RRHs in performing the wireless communications protocol using a carrier sense multiple access (CSMA) mechanism;

(ii) wherein the CU is maintaining a single BO counter for all the RRHs:

(A) wherein if the BO timeout arises before the CU has sent a Data and/or control message to the RRH, whereby the CU sends a Data and control message to the RRH to indicate BO timeout, and/or otherwise indicates the manner in which the RRH is to initiate Data transmission;

(B) wherein if the BO timeout arises after the CU has sent Data and/or control message to the RRH, the CU pauses ongoing BOs when it receives a CCA busy from an RRH, then resumes paused BO timer when it receives CCA idle from the same RRH, after which the CU transmits a Data and control message, including an initial or updated BO value to the RRH after receiving an initial or updated CCA status from the RRH;

(iii) wherein the CU is maintaining separate BO counters for the RRHs:

(A) wherein the CU determines to invoke a BO only after receiving CCA status from an RRH, and the CU informs each RRH of its BO timeout value which allows the RRH to synchronize CCA status with an RRH that has sent a reservation PPDU, and for the RRH to pass data to that RRH during reservation time; (a) wherein if the CU has received a CCA busy, or decoded a NAV, from the other RRH, then the CU pauses the BO timer for the corresponding RRH and resumes the BO timer after receiving a CCA idle from that RRH and after NAV expiration; (b) wherein if the CU has not received a CCA busy, or decoded a NAV, from the other RRH, then the CU continues the current BO procedure; and (B) wherein the CU determines not to wait for invoking a BO only after receiving CCA status from an RRH, comprising: (a) wherein there is not a BO time out the CU continues with a current BO procedure for that RRH; (b) wherein if there is any BO timeout then the CU sends Data and a control message to the corresponding RRH which had the BO timeout, and pauses the BO timer for other RRHs; wherein the CU determined to either: (1) resume BO timers for other RRHs and restart the BO timer after receiving a message from the TXOP holder RRH indicating that the CU should initiate a new BO when the CCA is idle; or (2) resume BO timers for other RRHs and restart the BO timer for the TXOP holder RRH at the estimated TXOP end time.

8. The apparatus of claim 7, wherein if the RRH receives Data and control message from the CU indicating the initial BO value, it should estimate the BO expiration time.

9. The apparatus of claim 7, wherein if the RRH detects that the medium is busy medium after the receiving an initial, or updated, BO timeout from the CU, then it is not to send the updated CCA status to CU since it is already out of date.

10. The apparatus of claim 7, wherein each RRH maintains information about the round-trip time, over the backhaul link, between itself and the CU.

11. The apparatus of claim 7, wherein the CU can indicate in its control messages to an RRH, how long the RRH should continue detecting the status of the medium if it has not detected that the medium, after receiving the control message from CU.

12. The apparatus of claim 7, wherein the CU is configured to receive reported NAV values from an RRH when that RRH can resolve the NAV information; and to receive a frame forwarded from that RRH if that RRH is unable to resolve the NAV information.

13. The apparatus of claim 7, wherein the CU directs an RRH not to forward a received PPDU to the CU, unless the frame is addressed to the RRH or to the CU.

14. A method of performing communication in a wireless network using remote radio heads (RRHs), comprising: (a) configuring each station (STA) on a wireless IEEE 802.11 network as either a separate STA, or as a STA within a multiple-link device (MLD), and each STA is configured as a Remote Radio Head (RRH) which is controlled by a central unit (CU), located at a different geographic location, over a wired backhaul link that is configured for connecting to multiple RRH, which may not be sufficiently spatially deviated to prevent interference between different RRHs; (b) wherein each RRH is operating in the wireless communications protocol using a carrier sense multiple access (CSMA) mechanism; (c) performing clear channel assessment (CCA) on a medium by each RRH to determine if the medium is busy or idle, prior to obtaining the medium for performing a communication, comprising: (i) broadcasting a physical layer protocol data unit (PPDU) by the RRH, as either: a reservation PPDU, or a PPDU to quiet the channel through using a network allocation vector (NAV), or using a quiet element spanning a certain time frame; (ii) wherein the broadcasted PPDU for obtaining the medium is transmitted after detecting that the medium is idle for a certain IFS time period, and without the need of a backoff (BO) procedure; (iii) occupying the medium during the reserved duration by the RRH and in synchronization with the CCA status and the BO status with its CU; and (iv) performing by the RRH based on status of buffered units: (A) having buffered units (BUs) with valid lifetimes, performs a BO procedure after a certain medium idle time has elapsed and then transmits its Data frame; (B) having zero BUs performs a BO procedure after a certain medium idle time before the end of an extended interframe space (XIFS) interval, with said XIFS interval commencing when the RRH transmits a CCA idle status to the CU with the XIFS interval ending when the RRH receives Data from the CU, after which upon BO completion the RRH transmits Data which was previously received from the CU.

15. The method of claim 14, wherein said XIFS is a new IFS time having a duration of a distributed coordination function (DCF) interframe Spacing (DIFS) time and a round-trip delay between RRH and its associated CU.

16. The method of claim 14, wherein if the CU has designated a primary RRH, then that primary RRH is the RRH which obtains the medium, while non-primary RRHs connected with the same CU do not perform a BO, and do not initiate transmission without receiving a signal from the CU indicating to do so.

17. The method of claim 14:
   wherein the RRH which sent the CCA idle status to the CU and then performed the BO, either: (a) completes frame exchanges before the end of the XIFS time, with the RRH initiating a new BO procedure; or (b) the RRH processes the frame exchange during the XIFS time, which must also not violate the transmission opportunity (TXOP) limitation and continues transmitting new Data frames received from the CU without invoking a new BO if the Data frame from the CU is received at the end of the XIFS time; and
   wherein the RRH ends its transmission, or suspend BO counting, upon receiving control signaling from the CU indicating it should not access the channel after receiving that signal.

18. The method of claim 14, wherein the RRH receiving Data and control signaling from the CU, also receives in the control signaling an indication to share the TXOP with other RRHs in one TXOP.

19. The method of claim 14, wherein an RRH receiving permission to share a TXOP is not required to perform a BO procedure during the shared TXOP.

* * * * *